United States Patent
Nadig et al.

(10) Patent No.: US 12,406,013 B1
(45) Date of Patent: Sep. 2, 2025

(54) DETERMINING SUPPLEMENTAL CONTENT FOR OUTPUT

(71) Applicant: Amazon Technologies, Inc., Seattle, WA (US)

(72) Inventors: Vinaya Nadig, Bothell, WA (US); Anjishnu Kumar, Seattle, WA (US); Samarth Bhargava, Redmond, WA (US); Omar Zia Khan, Clyde Hill, WA (US); Supriya Medapati, Irvine, CA (US); Prakash Kumar Jha, Irvine, CA (US)

(73) Assignee: Amazon Technologies Inc., Seattle, WA (US)

( * ) Notice: Subject to any disclaimer, the term of this patent is extended or adjusted under 35 U.S.C. 154(b) by 0 days.

(21) Appl. No.: 18/758,957

(22) Filed: Jun. 28, 2024

(51) Int. Cl.
G06F 16/00 (2019.01)
G06F 16/9535 (2019.01)
G10L 15/22 (2006.01)
H04L 67/306 (2022.01)

(52) U.S. Cl.
CPC .......... G06F 16/9535 (2019.01); G10L 15/22 (2013.01); H04L 67/306 (2013.01)

(58) Field of Classification Search
CPC .................................................. G06F 16/9535
See application file for complete search history.

(56) References Cited

U.S. PATENT DOCUMENTS

| | | | |
|---|---|---|---|
| 9,881,065 B2 * | 1/2018 | Banti | G06F 16/24578 |
| 11,657,095 B1 * | 5/2023 | Wu | G06F 16/90332 704/9 |
| 11,705,108 B1 * | 7/2023 | Radostev | G10L 15/22 704/260 |
| 12,216,692 B1 * | 2/2025 | Rogynskyy | G06N 3/0475 |
| 2016/0170994 A1 * | 6/2016 | Soderberg | G06F 16/435 707/748 |
| 2021/0073293 A1 * | 3/2021 | Fenton | H04L 51/08 |
| 2023/0177164 A1 * | 6/2023 | Tamboli | G06F 11/362 726/26 |
| 2024/0061832 A1 * | 2/2024 | Hoang | G06F 16/24561 |
| 2024/0256757 A1 * | 8/2024 | Manavoglu | G06F 16/954 |
| 2024/0320476 A1 * | 9/2024 | Chandrasekaran | G06N 20/00 |
| 2025/0045256 A1 * | 2/2025 | Gottlob | G06F 16/215 |
| 2025/0076059 A1 * | 3/2025 | Yankov | G06F 40/284 |
| 2025/0094455 A1 * | 3/2025 | Bista | G06F 16/3329 |
| 2025/0094480 A1 * | 3/2025 | Shi | G06F 16/3344 |

* cited by examiner

Primary Examiner — Noosha Arjomandi
(74) Attorney, Agent, or Firm — Pierce Atwood LLP

(57) ABSTRACT

Techniques for determining relevant and personalized supplemental content for a user are described. A system may prompt a language model to generate queries based on an entity (or entities) representing a user's affinity. In some examples, the language model may be prompted to generate an initial query corresponding to the entity and then generate one or more enriched queries based on the initial query. The one or more enriched queries may be used to search one or more content providers for supplemental content results. The supplemental content results may be aggregated, may be validated to ensure correspondence to the enriched query, and may be stored for future output. A system component may request supplemental content for output, at which time the system may select one or more supplemental content from storage, where the selection may be made to optimize relevancy for current user and situational context.

18 Claims, 12 Drawing Sheets

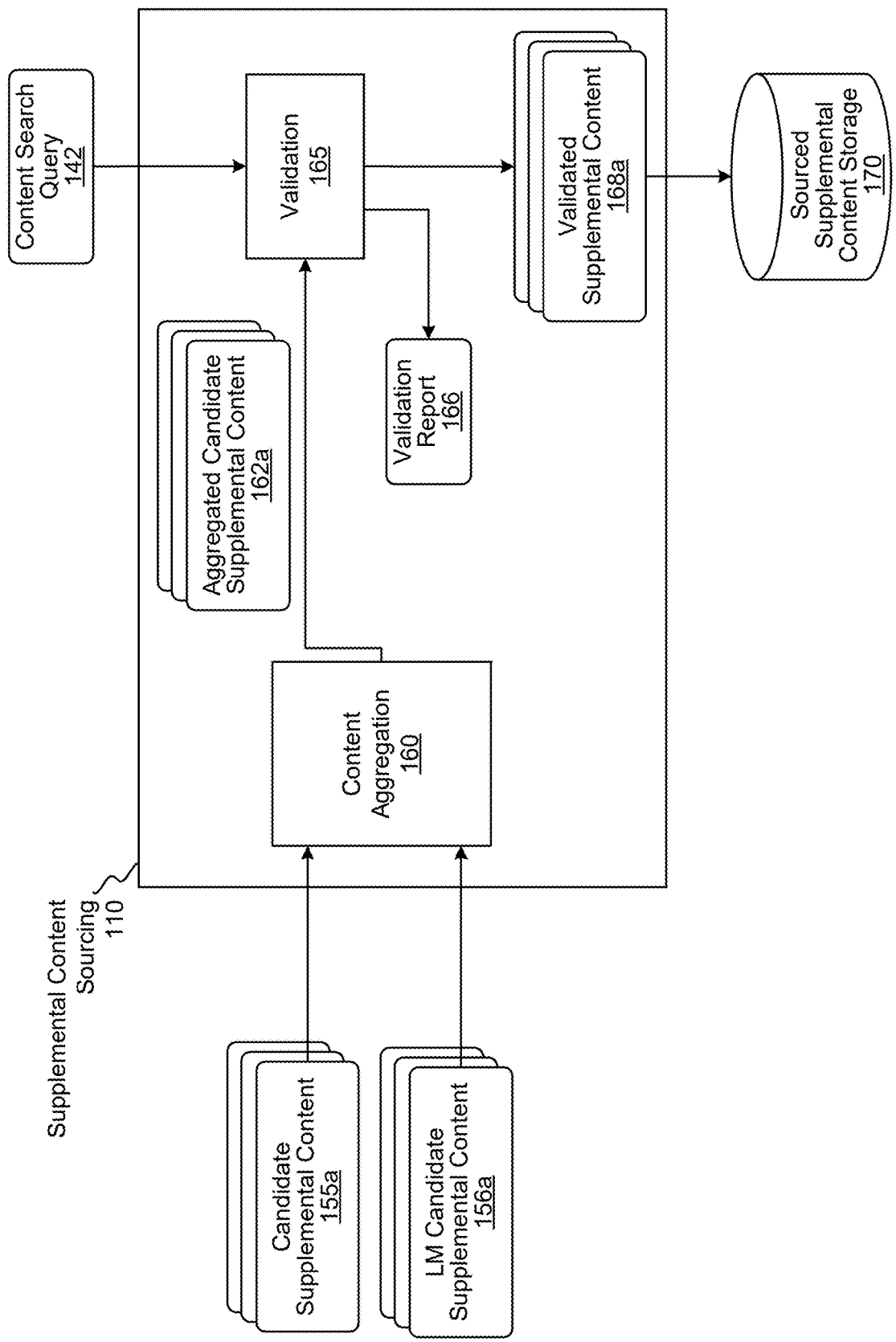

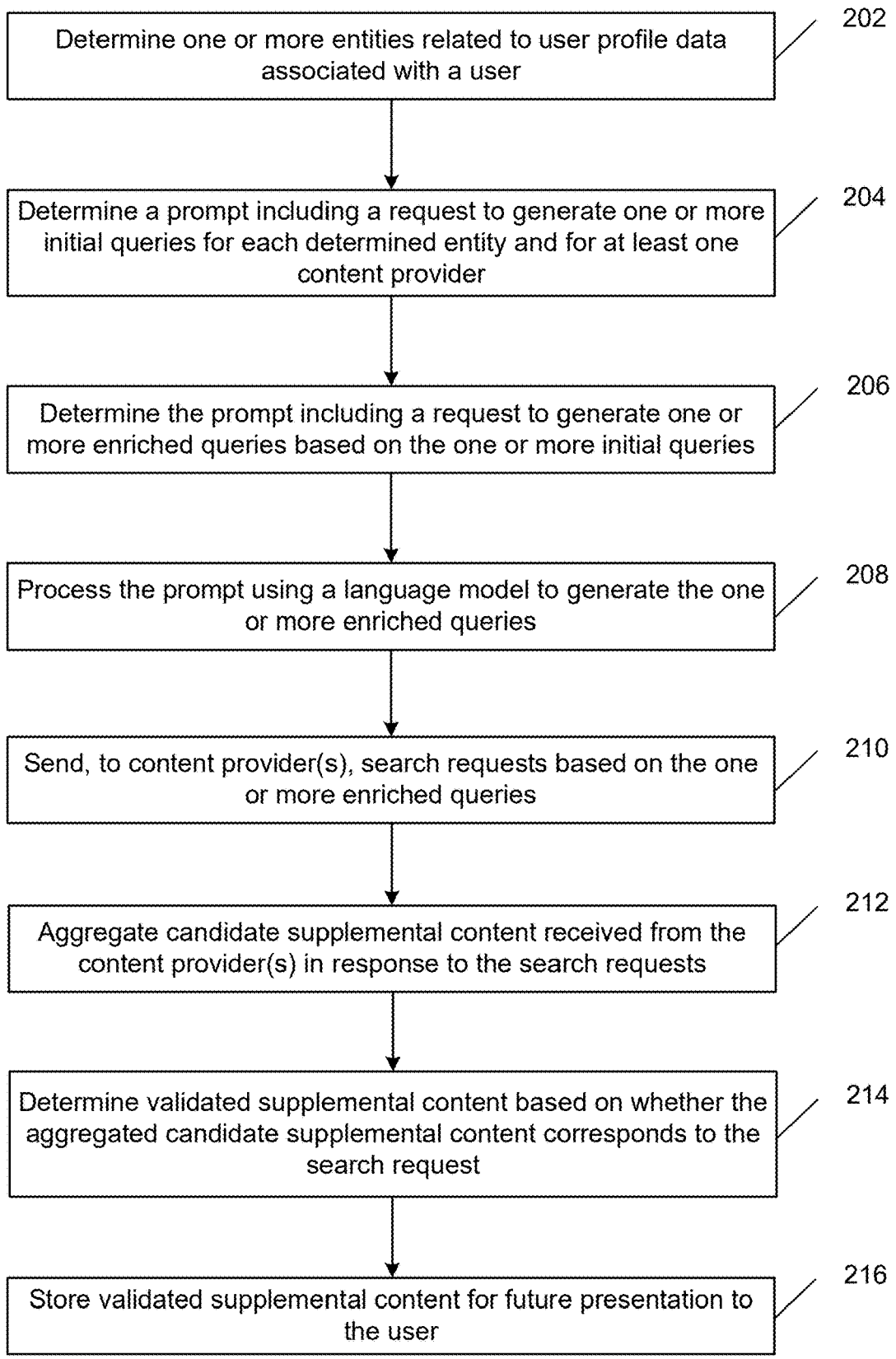

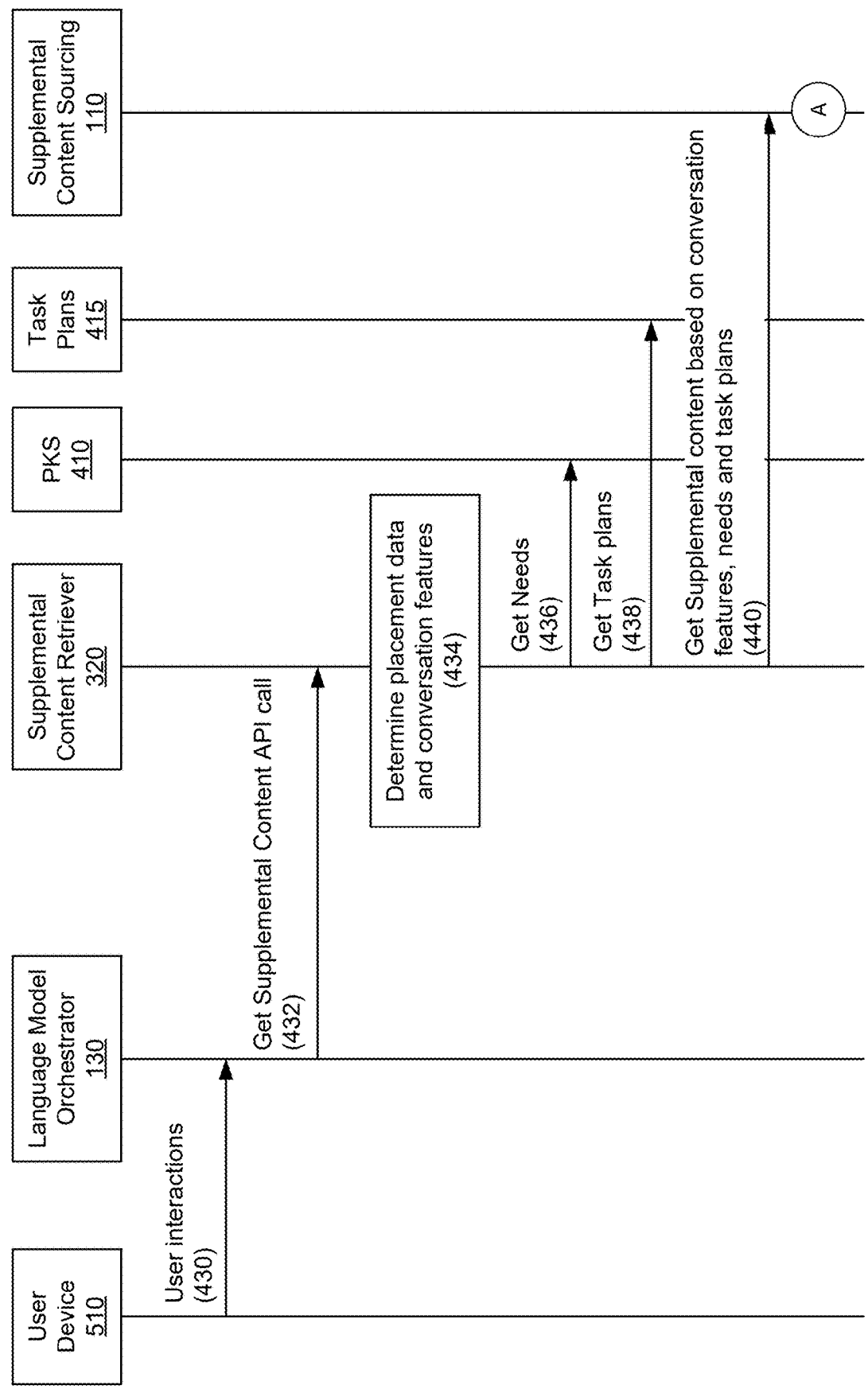

DETERMINING SUPPLEMENTAL CONTENT FOR OUTPUT

BACKGROUND

Natural language processing systems have progressed to the point where humans can interact with computing devices using their voices and natural language textual input. Such systems employ computing techniques to identify words spoken and written by a human user based on the various qualities of received input data. Speech recognition combined with natural language understanding processing techniques enable speech-based user control of computing devices to perform tasks based on the user's spoken or other natural language inputs. Such processing may be used by computers, hand-held devices, telephone computer systems, kiosks, and a wide variety of other devices to improve human-computer interactions.

BRIEF DESCRIPTION OF DRAWINGS

FIGS. 1A-1B are conceptual diagrams illustrating example components and processing of a system configured to determine supplemental content based on user profile data, according to embodiments of the present disclosure.

FIG. 2 is a flowchart illustrating an example process for determining supplemental content based on user profile data, according to embodiments of the present disclosure.

FIGS. 4A-4B are a signal flow diagram illustrating example processing for determining supplemental content for in-conversation output, according to embodiments of the present disclosure.

DETAILED DESCRIPTION

Figure 1A:
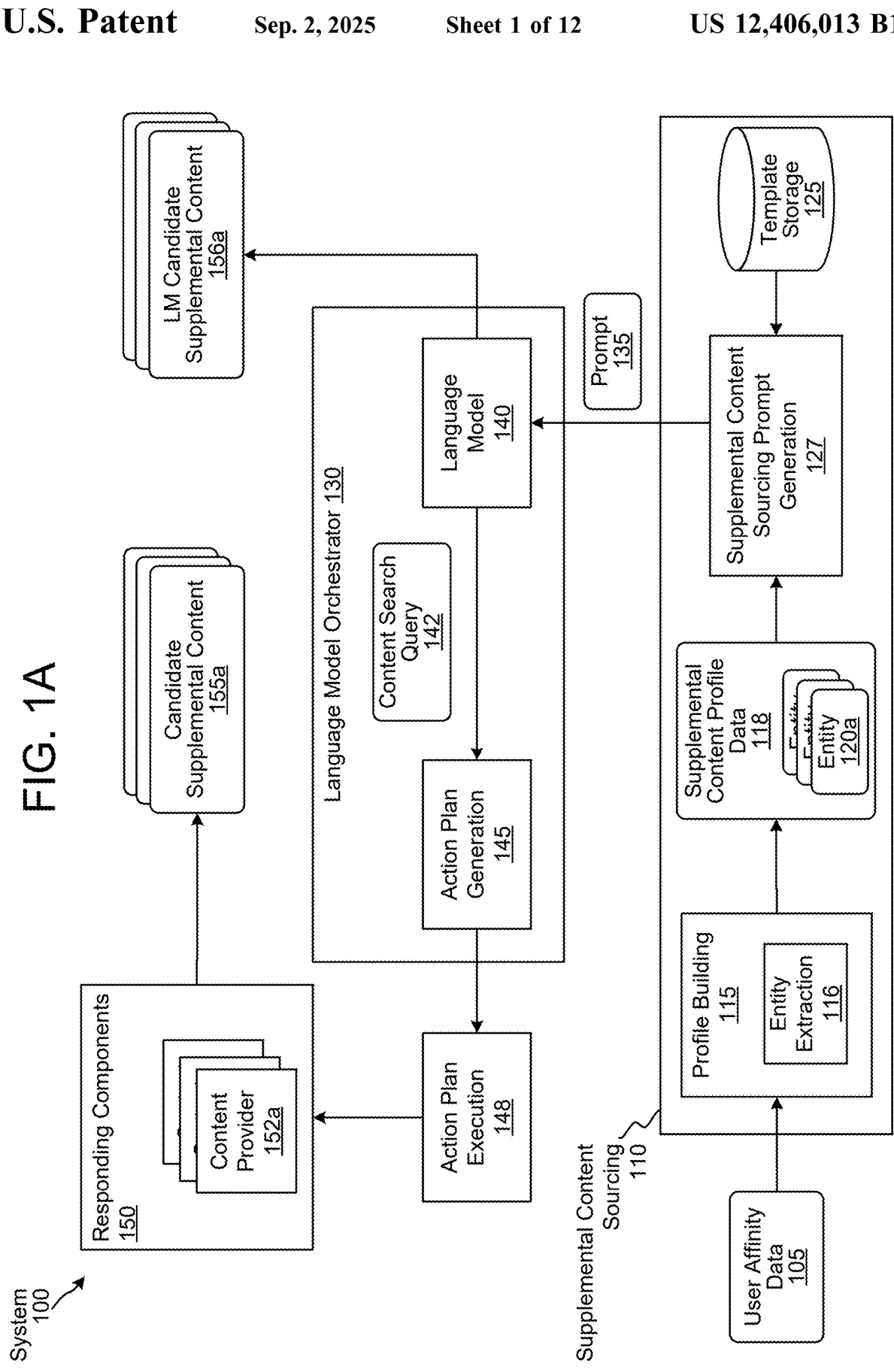

Natural language processing (NLP) is a field of computer science, artificial intelligence, and linguistics concerned with processing a user command input in the form of a natural human language (e.g., English, Chinese, etc.). Such a natural language command may come in the form of audio, text, image, or other format. Natural language processing may involve a number of different specific processing techniques such as those discussed below. Automatic speech recognition (ASR) is a field of computer science, artificial intelligence, and linguistics concerned with transforming audio data associated with speech into a textual or other token representation of that speech. Similarly, natural language understanding (NLU) is a field of computer science, artificial intelligence, and linguistics concerned with enabling computers to derive meaning from natural language inputs (such as spoken inputs). ASR and NLU are often used together as part of a language processing component of a system, and a single component can be used to input audio and output a natural language understanding of any speech in the audio. Synthesized speech generation (SSG) (including text-to-speech (TTS)) is a field of computer science concerning transforming textual and/or other data into audio data that is synthesized to resemble human speech. Natural language generation (NLG) is a field of artificial intelligence concerned with automatically transforming data into natural language (e.g., English) content. Speech-to-speech (S2S) is a field of computer science, artificial intelligence, and linguistics in which embedding data is generated to represent speech in audio data and, using one or more models, the embedding data is processed to generate audio data and/or a system command (such as an application programming interface (API) call) responsive to the speech. Language modeling (LM) is the use of various statistical and probabilistic techniques to determine the probability of a given sequence of words occurring in a sentence. LM can be used to perform various tasks including understanding a natural language input and performing generative tasks that involve generating natural language output data.

Certain systems may be configured to respond to natural language (e.g., spoken or typed) user inputs. For example, in response to the user input "what is today's weather," the system may output weather information for the user's geographic location. As another example, in response to the user input "what are today's top stories," the system may output one or more news stories. For further example, in response to the user input "tell me a joke," the system may output a joke to the user.

A system may receive a user input as speech. For example, a user may speak an input to a device. The device may send audio data, representing the spoken input, to the system. The system may perform ASR processing on the audio data to generate ASR data (e.g., text data, token data, etc.) representing the user input. The system may perform processing on the ASR data to determine an action responsive to the user input. A system may also receive a natural language user input in the form of text, such as a text input from a computer, phone, or other device. Alternatively, or in addition, the device itself may perform all or a portion of such processing.

In some instances, the system may be configured to process input text data (such as ASR data or text entered into a user interface or extracted from an image using optical character recognition) using one or more language models (e.g., one or more large language models (LLMs)) to determine a response to the user input. For example, in response to a user input of "what is the history of the United States," the language model(s) may output a synopsis of the history of the United States of America.

An artificial intelligence (AI) system may use ASR, NLU, NLG, and/or TTS, each with and/or without its own and/or a shared language model, for processing user inputs, including natural language inputs (e.g., typed, displayed, and spoken inputs) and other type of inputs (e.g., inputs not received from a user, inputs received from a system component, inputs representing occurrence of events, etc.).

The AI system may use other types of generative models including a model that processes audio/speech as an input and outputs audio/synthesized speech (a speech-to-speech model). Another example generative model that may be used is a multi-modal model that processes two or more types of data (e.g., audio, text and/or image) as inputs and/or outputs two or more types of data (e.g., audio, text and/or image).

Certain systems may also be configured to output supplemental content. As used herein, "supplemental content" may refer to content that is not directly responsive to a user input (e.g., content unresponsive to a user input which may or may not be related to the responsive content or user input). Supplemental content may include content supplementing (e.g., augmenting, complementing, corresponding to, in addition to, etc.) a user interaction. For example, a user input may request booking of a flight, the system performs actions to book the requested flight, and then the system may output supplemental content including weather information for an arrival location of the flight. As another example, the system may determine that a user likes a particular artist (based on user inputs repeatedly requesting output of a particular songs by the artist) and the system may output supplemental content including other songs and/or artists the user may be interested in. As yet another example, the system may determine that a user likes a particular sports team, the system may determine current or trending news for the sports team, future sporting events of the sports team, or other related content, and the system may output supplement content including the determined content. In some examples, the system may ask the user whether supplemental content is desired/should be outputted (e.g., the system may output "Would you like to know the weather for your destination?", "I have other music suggestions. Just say "Show me more music", "Would you like to hear more?", and the like). The supplemental content may be advertising or other sponsored content related to the user's input and/or the system's responsive output.

The system may output the supplement content in different forms via different output devices. For example, the supplement content may be displayed as text and/or other visual content (e.g., graphics, images, icons, etc.), may be presented as synthesized speech or other audio (e.g., added to open ended playlist or internet "radio" station), may include selectable GUI elements (e.g., buttons, links, etc.) and the like. The system may output the supplemental content as a notification, a message (e.g., email, SMS, MMS, etc.), content on a "home" page or screen of an application, device or website, and the like. The system may output the supplemental content after user requested content is outputted, after a user requested action is performed, when a device is activated, when a device detects user presence, as a push notification, etc. For example, a user may turn on a user device (e.g., an Echo Show) and a home screen of the user device may present supplemental content including an upcoming sporting event and a link to purchase tickets to attend the event. As another example, the system may complete playback of a requested song and then the system may output supplement content including "you may also like . . . " or just playing the supplemental content, which may be outputted as synthesized speech, and one or more songs, which may be displayed on a user device screen.

In some cases, supplemental content may be determined as a proactive effort, which may involve anticipating user needs to provide timely and relevant suggestions through home screen content (e.g., "cards" or other list-type content), proactive recommendations in web/mobile application feeds, and audio/video in-conversation tips, alongside timely notifications. One challenge can be providing supplemental content that is diverse, relevant and personalized, which can cause repetitive and less engaging user experiences.

The present disclosure describes techniques for determining supplemental content that is diverse (e.g., different from prior outputs of supplemental content, different from supplemental content outputs for other users, etc.), relevant and personalized for a user, to enhance user experiences and improve user engagement with an AI system. The techniques of the present disclosure also enable sourcing of supplemental content from various content providers while reducing workload on the content providers by not requiring content conformed to a particular format.

A system of the present disclosure can include, among other things, a supplemental content sourcing component that is configured to interface with (e.g., prompt) a language model to search for relevant and personalized supplemental content. In some embodiments, the supplemental content sourcing component may determine one or more entities corresponding to user affinity data and may prompt the language model to generate queries based on the determined entities. In some embodiments, the language model may be prompted to generate an initial query corresponding to an entity, and then generate an "enriched" query for the initial query, where the enriched query may include additional information (e.g., well-known brand names, popular sports players, etc.). The language model may generate the queries based on the model's parametric knowledge. The generated queries may be used to search content providers for supplemental content that is relevant and personalized for the user. The user affinity data may correspond to a user's affinities including items of interest (e.g., hobbies, sports teams, media genre, etc.), preferred items (e.g., preferred applications, preferred music, preferred restaurants, etc.), relevant items (e.g., items related to user's location such as news, weather, etc.), and the like.

The system can also include a supplemental content retriever component configured to determine the "best" supplemental content to output. In some embodiments, the supplemental content retriever component may rank candidate supplemental contents utilizing user affinities, preferences, and situational context to select corresponding content, optimizing for specific output channel needs (including, for example, home screen content, web/mobile application feeds, push notifications, etc.). The supplemental content retriever component may also include a quality guardrails component configured to ensure supplemental content is relevant to the user and appropriate (e.g., does not include profanity for minor users, violent or harmful content without warning, etc.).

In some embodiments, the system may also use user feedback, device type, location, sponsorship, monetization opportunities, and other factors for ranking. The system may be optimized to rank content based on recency, relevancy and discovery/user engagement.

In a non-limiting example, for a user profile indicating that a user has purchased e-books and has an affinity for a [sports team], the system may determine a prompt for a language model that may include: "User owns a [device type], has purchased [e-book 1], [e-book 2], [e-book 3] in the last 30 days. User follows the [sports team] for score updates and asked the AI system this morning "who did the [sports team] draft yesterday?" that shows user is an avid fan of the team. Provide 2 e-book recommendations that this user would like focusing on interests in sports and [sports team]. Provide 1) Book title, 2) Author, 3) Rating, 4) Book Image, 5) GUI button to enable user to purchase the recommended book." In this manner, the system may retrieve personalized supplemental content for a user.

Teachings of the present disclosure provide, among other things, an improved user experience for AI systems by presenting diverse, relevant and personalized supplemental content that can improve user engagement with the system. The techniques described herein can improve efficiency (e.g., reduce cost, time and resources used) on developer and content provider side, while improving user engagement with the system and provided content.

A system according to the present disclosure will ordinarily be configured to incorporate user permissions and only perform activities disclosed herein if approved by a user. As such, the systems, devices, components, and techniques described herein would be typically configured to restrict processing where appropriate and only process user data in a manner that ensures compliance with all appropriate laws, regulations, standards, and the like. The system and techniques can be implemented on a geographic basis to ensure compliance with laws in various jurisdictions and entities in which the components of the system and/or user are located.

Language modeling is the use of various statistical and probabilistic techniques to determine the probability of a given sequence of words occurring in a sentence. Language models analyze bodies of text data to provide a basis for their word predictions. The language models are generative models, that is they are configured to generate a sequence of data (for example representing text) based on input data, such as one more text prompts. In some embodiments, one or more of the language models may be a large language model (LLM). A language model (e.g., LLM) is an advanced artificial intelligence system designed to process, understand, and generate human-like text based on relatively large amounts of data. In some embodiments, a language model (or another type of generative model) may be further designed to process, understand, and/or generate multimodal data including audio, text, image, and/or video. A language model may be built using deep learning techniques, such as neural networks, and may be trained on extensive datasets that include text (or other type of data, such as multi-modal data including text, audio, image, video, etc.) from a broad range of sources, such as old/permitted books and websites, for natural language processing. As compared to a relatively smaller language model, an LLM uses an expansive training dataset and can include a relatively large number of parameters (in the range of billions, trillions or more), hence they are called "large" language models. In some embodiments one or more of the language models (and their corresponding operations, discussed herein below) may be the same language model.

In some embodiments, the language model(s) may be transformer-based sequence to sequence (seq2seq) models involving an encoder-decoder architecture. In an encoder-decoder architecture, the encoder may produce a representation of an input (e.g., audio, text, image, video, etc.) using a bidirectional encoding, and the decoder may use that representation to perform some task. In some such embodiments, one or more of the language models may be a multilingual (approximately) 20 billion parameter seq2seq model that is pre-trained on a combination of denoising and Causal Language Model (CLM) tasks in various languages (e.g., English, French, German, Arabic, Hindi, Italian, Japanese, Spanish, etc.), and the language model may be pre-trained for approximately 1 trillion tokens. Being trained on CLM tasks, the language model(s) may be capable of in-context learning. Examples of such language models include some of the Amazon Alexa and Amazon Web Services (AWS) Titan family of generative models.

In other embodiments, the language model(s) may be a decoder-only architecture. The decoder-only architecture may use left-to-right (unidirectional) encoding of the input (e.g., audio, text, image, video, etc.). Examples of such language models include others in the Amazon Alexa and AWS Titan family of models as well as the Generative Pre-trained Transformer 3 (GPT-3), GPT-4, and other versions of GPT. GPT-3 reportedly has a capacity of (approximately) 175 billion machine learning parameters. GPT-4 reportedly has a capacity of (approximately) 1.76 trillion machine learning parameters.

Other examples of language models include BigScience Large Open-science Open-access Multilingual Language Model (BLOOM), Language Model for Dialogue Applications model (LaMDA), Bard, Large Language Model Meta AI (LLaMA), etc.

In some embodiments, the system may include one or more machine learning models (e.g., discriminative models) instead of or in addition to the generative model(s). Such machine learning model(s) may receive text and/or other types of data as inputs (e.g., audio, image, video, etc.), and may output text and/or the other types of data. Such model(s) may be neural network-based models, deep learning models, classifier models, autoregressive models, seq2seq models, etc.

In some embodiments, the input to a generative model may be in the form of a prompt. A prompt may be a natural language input, for example, a directive or request, for the generative model to generate an output according to the prompt. The output generated by the generative model may be a natural language output responsive to the prompt. In some embodiments, the output may additionally or instead be another type of data, such as audio, image, video, etc. The prompt and the output may be text in a particular language (e.g., English, Spanish, German, etc.). For example, for an example prompt "how do I cook rice?", the generative model may output a recipe (e.g., a step-by-step process represented by text, audio, image, video, etc.) to cook rice. As another example, for an example prompt "I am hungry. What restaurants in the area are open?", the generative model may output a list of restaurants near the user that are open at the time of the user prompt.

The generative models may be configured using various learning techniques. For example, in some embodiments, the language models may be configured using few-shot learning. In few-shot learning, the model learns how to learn to solve the given problem. In this approach, the model is provided with (e.g., in the prompt) a limited number of examples (i.e., "few shots") from the new task, and the model uses this information to adapt and perform well on that task. Few-shot learning may require fewer amount of training data than implementing other fine-tuning techniques. Few-shot learning may be implemented by including examples (exemplars) in a prompt to the model and the model may perform in-context learning. For further example, in some embodiments, the language models may be configured using one-shot learning, which is similar to few-shot learning, except the model is provided with a single example (e.g., in the prompt). As another example, in some embodiments, the language models may be configured using zero-shot learning. In zero-shot learning, the model solves the given problem without examples of how to solve the specific/similar problem and just based on the model's training dataset. In this approach, the model is provided with data not observed during training, and the model learns to generate an appropriate output based on its learning with regard to other data. Other learning techniques may involve performing offline/training operations for fine-tuning (e.g., using supervised fine-tuning techniques) a pre-trained generative model for a particular task.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems typically need to recognize, retain, and use information collected during more than one input during a back-and-forth or "multi-turn" interaction with the user.

As used herein, a "dialog" may refer to multiple related user inputs and system outputs (e.g., through user device(s)) between the system and the user that may have originated with a single user input initiating the dialog. Thus, the data associated with a dialog may be associated with a same dialog identifier, which may be used by components of the overall system 100 to associate information across the dialog. Subsequent user inputs of the same dialog may or may not start with the user speaking a wakeword. Each natural language input may be associated with a different natural language input identifier, and each natural language input identifier may be associated with a corresponding dialog identifier. Further, other non-natural language inputs (e.g., image data, gestures, button presses, etc.) may relate to a particular dialog depending on the context of the inputs. For example, a user may open a dialog with the system 100 to request a food delivery in a spoken utterance and the system may respond by displaying images of food available for order and the user may speak a response (e.g., "item 1" or "that one") or may gesture a response (e.g., point to an item on the screen or give a thumbs-up) or may touch the screen on the desired item to be selected. Non-speech inputs (e.g., gestures, screen touches, etc.) may be part of the dialog and the data associated therewith may be associated with the dialog identifier of the dialog.

Figure 7:
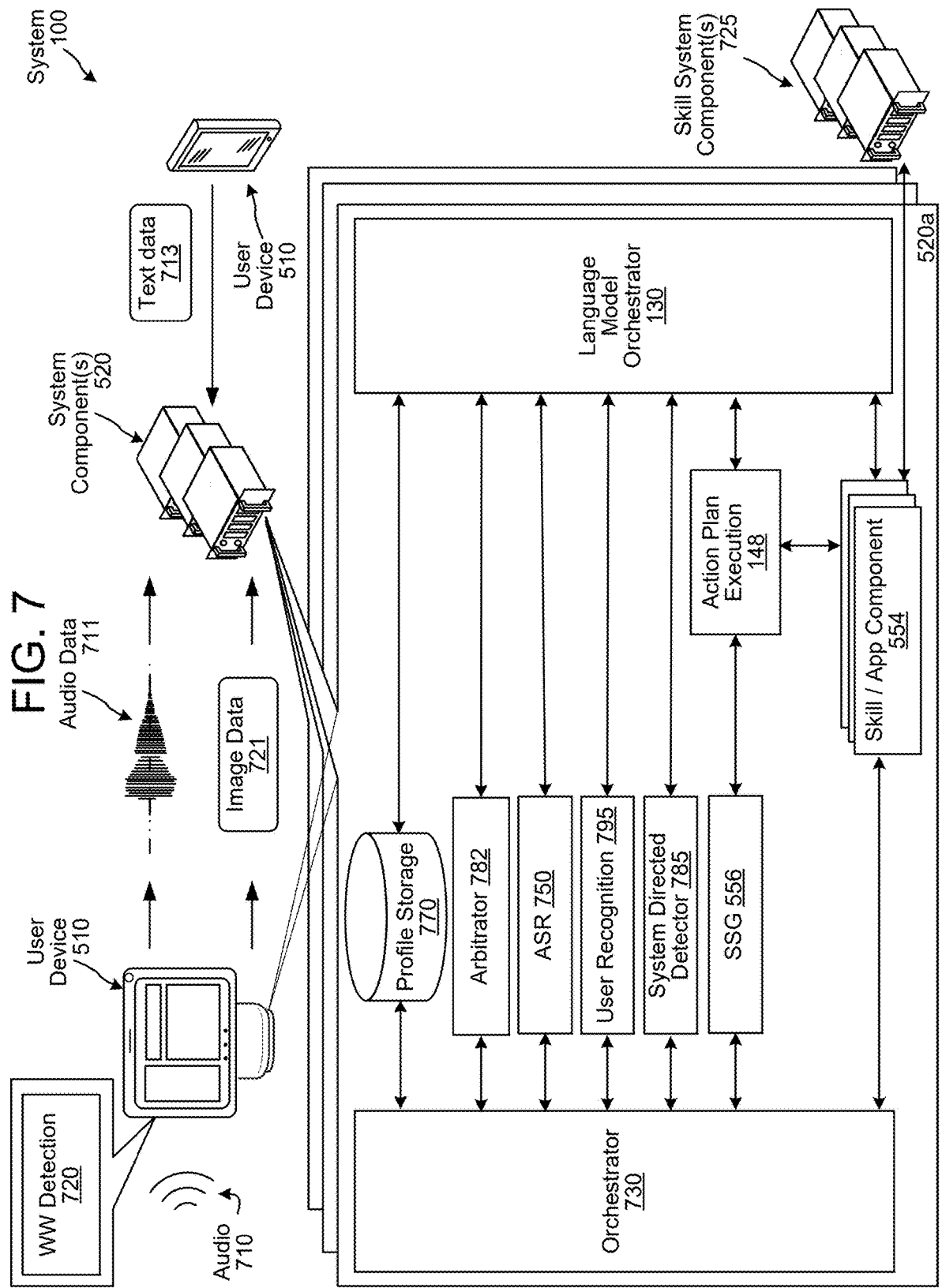
FIG. 7 is a conceptual diagram illustrating example components of the system, according to embodiments of the present disclosure.

FIGS. 1A-1B are conceptual diagrams illustrating example components and processing of a system 100 configured to determine supplemental content based on user profile data, according to embodiments of the present disclosure. In some embodiments, the system 100 may include a supplemental content sourcing component 110, a language model orchestrator component 130, an action plan execution component 148 and one or more responding components 150. In some embodiments, the supplemental content sourcing component 110 may be implemented as one of system components 520 (as shown in FIG. 7). Other embodiments may involve fewer or more components than shown in FIGS. 1A-1B.

The supplemental content sourcing component 110 may be configured to determine (e.g., source, retrieve, etc.) supplemental content corresponding to user affinity data 105, which may represent interests, affinities, and other items associated with a user and the determined supplemental content may include personalized supplemental content for the user. In some embodiments, as shown in FIG. 1A, the supplemental content sourcing component 110 may leverage (e.g., use, interface, prompt, etc.) a language model-based system, including the language model orchestrator component 130 and a language model 140, to determine the supplemental content. In some embodiments, the supplemental content sourcing component 110 may process the user affinity data 105 during offline operations to determine validated supplemental content 168 (shown in FIG. 1B).

The user affinity data 105 may be associated with a user (e.g., user 505 shown in FIG. 5) and may be stored in a profile storage 770 (shown in FIG. 7). The user affinity data 105 may include interests, affinities, or other items specified by the user (e.g., while setting up a user account, while entering or updating user preferences, etc.). The user affinity data 105 may include data representing a user's affinities that may be determined (e.g., inferred, extracted, etc.) from interactions data associated with the user. Interactions data may include data for past interactions for a period of time (e.g., past 30 days, past 3 months, past year, etc.) and may include user inputs, system responses, user feedback, system outputs, application, skill or domain, etc. Examples of interactions data may include past dialogs between the user and the system, past user requests to the system to perform actions (e.g., "play a yoga instruction video"), past user inputs/actions including purchases, searches, etc. (e.g., a search of yoga equipment), past applications interacted with (e.g., search for "yoga books" on Audible), and others. In some embodiments, the user affinity data 105 may include current interaction data corresponding to a current (e.g., an on-going, present, active, etc.) interaction between the user and the system (e.g., current user inputs, current system responses, current system outputs, current application, skill or domain involved, etc.). The user affinity data 105 may correspond to items of interest (e.g., hobbies, sports teams, media genre, etc.), preferred items (e.g., preferred applications, preferred music, preferred restaurants, etc.), relevant items (e.g., items related to user's location such as news, weather, etc.), and the like. The user affinity data 105 may also include a representation (e.g., a description, a summary, etc.) of user inputs or requested actions that may indicate or imply the user's interests or affinities. For example, the user affinity data 105 may include "user likes [sports team] and user requested score updates for the [sports team] last week." As another example, the user affinity data 105 may include "user is interested in yoga". As yet another example, the user affinity data 105 may include "user watches [sports team] games."

Referring to FIG. 1A, the supplemental content sourcing component 110 may process the user affinity data 105 using a profile building component 115 that is configured to determine supplemental content profile data 118 representing information that can be used to determine personalized supplemental content for the user. In some embodiments, the profile building component 115 may include an entity extraction component 116 that may be configured to determine (e.g., extract) entities 120 (e.g., persons, places, things, etc.) based on the user affinity data 105. The entity extraction component 116 may extract directly mentioned entities in the user affinity data 105 as well as inferred related keywords from the user affinity data 105. Direct entities may be the keywords that are explicitly specified in the user affinity data 105, while inferred keywords may be additional words and phrases that are not directly stated but still capture the essence and main ideas within the user affinity data 105.

In some embodiments, the entity extraction component 116 may include a machine learning model(s) that is trained using pairs of sample inputs (e.g., sample statements or portions of example user profile data) and corresponding desired model outputs including direct entities and/or inferred entities. Example machine learning models may be configured to perform natural language processing (NLP) tasks.

In some embodiments, the entity extraction component 116 may include a language model (e.g., the language model 140) that may be configured (e.g., using supervised finetuning (SFT)) to determine the supplemental content profile data 118 based on the user affinity data 105. In some examples, the language model may be provided with (e.g., via a prompt) exemplars for in-context learning, where the exemplars may include sample inputs (e.g., sample statements or portions of example user profile data) and corresponding desired language model outputs including direct entities and/or inferred entities. In some examples, the exemplars may include the entities in JavaScript Object Notation (JSON) format so that the language model can learn the pattern mapping between natural language text and JSON entity representations.

The profile building component 115 may include other components and may be configured for other techniques to determine information for the supplemental content profile data 118. For example, the profile building component 115 may determine one or more devices and/or device types associated with the user (e.g., from the user affinity data 105 or other data stored in the profile storage 770) and may determine the supplemental content profile data 118 to include the devices and/or device types (e.g., a [brand] smart TV, a [brand] smart speaker, a [brand] refrigerator, etc.).

The profile building component 115 may output the supplemental content profile data 118 including one or more entities 120 representing the user's interests, affinities, etc. The supplemental content profile data 118 may be processed by a supplemental content sourcing prompt generation component 127, included in the supplemental content sourcing component 110, to determine a prompt 135.

The supplemental content sourcing prompt generation component 127 may be configured to determine the prompt 135 to include information (e.g., requests, inputs, exemplars, etc.) that causes the language model 140 to generate one or more search queries for supplemental content. The supplemental content sourcing prompt generation component 127 may use a template(s) from a template storage 125 to determine the prompt 135.

In some embodiments, the prompt 135 may include a request or directive for the language model 140 to determine supplemental content relevant and/or personalized for the user associated with the user affinity data 105 or the entities 120. For example, the prompt 135 may include "The user likes [entities 120]. Can you generate content that the user may be interested in based the user liking [entities 120]?" As part of determining the supplemental content, the prompt 135 may include further directives or requests described below (e.g., a request to generate a query for content providers).

In some embodiments, the prompt 135 may include a request or directive for the language model 140 to generate a query (e.g., an initial query) based on the supplemental content profile data 118. The prompt 135 may include one or more of the entities 120. In example embodiments, the prompt 135 may indicate a number of queries to be generated for individual entities 120 (e.g., the prompt 135 may include "generate 3 queries for each entity"). In example embodiments, the prompt 135 may indicate one or more content providers 152 to generate queries for. In example embodiments, the prompt 135 may include exemplars (e.g., for in-context learning) including sample input entities and corresponding output queries (which may be manually generated). In examples, the template from the template storage 125 may include the number of queries, the content providers 152 and/or the exemplars.

In some embodiments, the supplemental content sourcing prompt generation component 127 may select a template from the template storage 125 based on an entity type corresponding to one or more of the entities 120. The selected template may indicate a particular content provider(s) 152 corresponding to the entity type. The selected template may indicate a particular number of queries and/or include exemplars corresponding to the entity type.

In some embodiments, the prompt 135 may include a request or directive for the language model 140 to generate "enriched" queries based on the initial queries generated for the entities 120. An enriched query may include additional information (or modified information) than the initial query and from which a responding component 150 can generate "better" search results (e.g., concrete, real-world search results). The language model 140 may be directed to enrich the initial query using the model's parametric knowledge, metadata and/or other information provided by content providers, etc. In example embodiments, the prompt 135 may include instructions on how to enrich a query for a particular entity type and/or content provider. Example instructions may include adding brand names for product shopping queries, adding popular sports team player(s) for sports team-based queries, adding popular actors for movie(s) based queries, adding local event venues for event ticketing queries, etc. In some embodiments, a selected template from the template storage 125 may include instructions for generating enriched queries, where the instructions may correspond to a particular entity type and/or particular content provider.

In example embodiments, the prompt 135 may include exemplars (e.g., for in-context learning) including a sample initial query and a corresponding enriched query so that the language model 140 may learn how to transform an initial query into a an enriched inquiry. For example, the language model 140 may modify (e.g., add, augment, update, etc.) an initial query to include certain products or brand names (e.g., well-known, famous, trending, popular, etc.) that users may identify and/or search for.

In some embodiments, the prompt 135 may request the language model 140 to first generate an initial query and then generate an enriched query for the initial query. In some cases, such requests may correspond to a chain of thought (CoT) prompting technique that involves enabling complex reasoning capabilities through intermediate reasoning steps. The CoT prompting technique may be combined with few-shot prompting by including exemplars in the prompt 135 to teach the language model 140 to perform certain reasoning steps before generating a response.

In some embodiments, the prompt 135 may include a request or directive for the language model 140 to output a reason (e.g., data representing the model's reasoning) for the generated queries, for example, the initial query and/or the enriched query. The prompt 135 may include exemplars illustrating reasons for generated queries based on entities. Directing the language model 140 to generate its reasoning may improve the model's accuracy in understanding complex problems, according to CoT techniques.

The prompt 135 may be processed by the language model 140. Based on processing the prompt 135, that includes a request to generate initial queries corresponding to one or more entities 120 and then to generate enriched queries based on the initial queries, the language model 140 may output model output data (e.g., content search query 142). The content search query 142 may include the enriched queries generated by the language model 140. In some embodiments, an enriched query may indicate a content provider 152 for which the enriched query is generated. The language model 140 may generate model output data that may include the initial queries corresponding to the entities 120. The model output data may also indicate the model's reasoning for the initial queries (and/or the enriched queries). The model output data may include natural language data (e.g., text data, text tokens, etc.). In some embodiments, the language model 140 may generate one or more initial queries corresponding to an individual entity. In some embodiments, the language model 140 may generate one or more enriched queries for an individual initial query.

In some embodiments, the language model orchestrator component 130 may send the content search query 142, including one or more enriched queries, to an action plan generation component 145. The action plan generation component 145 may be configured to identify one or more actions corresponding to the content search query 142 (included in the model output data) generated by the language model 140. The action plan generation component 145 may determine an action to be performed by one of the content providers 152 (included in the responding components 150). In example embodiments, the action plan generation component 145 may output action plan data including one or more actions, where an action corresponds to an enriched query in the content search query 142 and indicates the content provider 152 to perform the action. In some embodiments, the action plan generation component 145 may output action plan data including an API request (or call) corresponding to the action to be performed by the content provider 152.

The content provider(s) 152 may be a component, a system, a device, etc. configured to provide content related to a particular domain, functionality, application, etc. A "domain" may include various skills, applications or other components relating to a particular area of functionality. For example, a music domain may include various components (e.g., a first music application, a second music application, etc.) that can respond to a user's request to play music, enable a user to purchase music, etc. In another example, a smart-home domain may include components that enable a user to control various home devices.

Examples of content providers 152 include a shopping component (e.g., Amazon shopping), a media playback component (e.g., Prime Video), an e-book component (e.g., Kindle), an audiobook or podcast component (e.g., Audible), a smart home system, an event ticketing component, a restaurant reservations component, trending news component, local information updates component, etc. Example content providers 152 may also include a system that generates content (e.g., supplemental content) using a language model or other generative model. In some embodiments, the system 100 (e.g., an AI assistant system) may provide a supplemental content system that is configured to provide supplemental content for one or more domains, topics, interests, etc. In some embodiments, the content providers 152 may be configured to receive and respond to API requests/calls.

The language model orchestrator component 130 may send the output from the action plan generation component 145 to the action plan execution component 148. The action plan execution component 148 may process the output (from the action plan execution component 148) to generate one or more requests to perform an action (e.g., API requests 636)

for a particular content provider 152. For example, if the output from the action plan generation component 145 includes a search query for a shopping component 152a, then the action plan execution component 148 may determine an API request/call to the shopping component 152a. As a further example, if the output from the action plan generation component 145 includes a search query for a media playback component 152b, then the action plan execution component 148 may determine an API request/call to the media playback component 152b. In some embodiments, the action plan execution component 148 may determine an API request/call for multiple shopping components 152 based on the action plan generation component 145 indicating a single action to search a shopping component.

Based on receiving API requests/calls, the content providers 152 may output candidate supplemental content 155 (e.g., a shopping component 152a may output candidate supplemental content 155a, a media playback component 152b may output candidate supplemental content 155b, etc.). As such, the system 100 may determine multiple different candidate supplemental content 155 provided by multiple different content providers 152 based on the user affinity data 105. The candidate supplemental content 155 may include one or more types of data, for example, text data, graphics, icons, image data, video data, links (e.g., links to websites, links to data storages, etc.), GUI elements, payload to enable access to content, payload to enable display of content, etc. In example embodiments, the content providers 152 may use different search techniques to determine search results and may output search results based on the different search techniques. Example search techniques include text-based searching and vector-based searching.

In some embodiments, the language model 140 may generate supplemental content based on the prompt 135 including a request or directive to determine supplemental content. For example, the language model 140 may generate model output data that may include, in addition to or instead of the content search query 142, one or more instances of language model (LM) candidate supplemental content 156. The LM candidate supplemental content 156 may include content determined by the language model 140 itself, using the model's parametric knowledge. For example, for the entity 120 including "yoga", then the language model 140 may generate example LM candidate supplemental content 156a including "Since you like yoga, you may be interested in learning more about the history of yoga. Did you know yoga was first practiced in [year] in [country]? Yoga practice started as." and other historical information related to yoga. As another example, for the entity 120 including "yoga", the language model 140 may generate another/additional example LM candidate supplemental content 156b including "Yoga has many benefits including. Experts say that it is best to practice yoga . . . " and other information related to the practice of yoga. As yet another example, for the entity 120 including "yoga", the language model 140 may generate another/additional example LM candidate supplemental content 156c including "Since you like yoga, you may be interested in healthy eating habits. A healthy diet along with yoga practice can provide a great number of benefits . . . "

Figure 5:
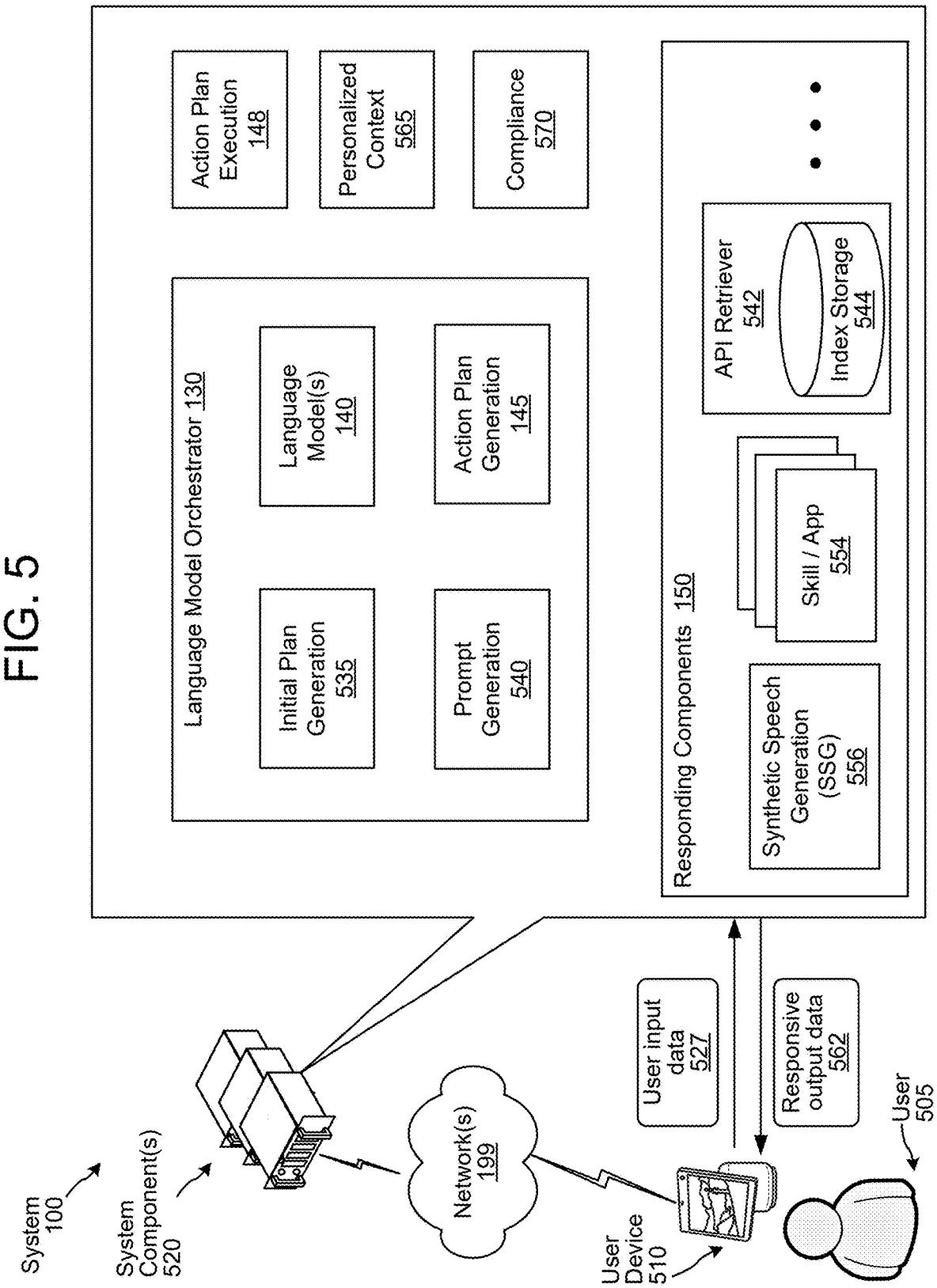
FIG. 5 is a conceptual diagram illustrating example components of a system configured to use a language model to determine a response to a user input, according to embodiments of the present disclosure.
Figure 6:
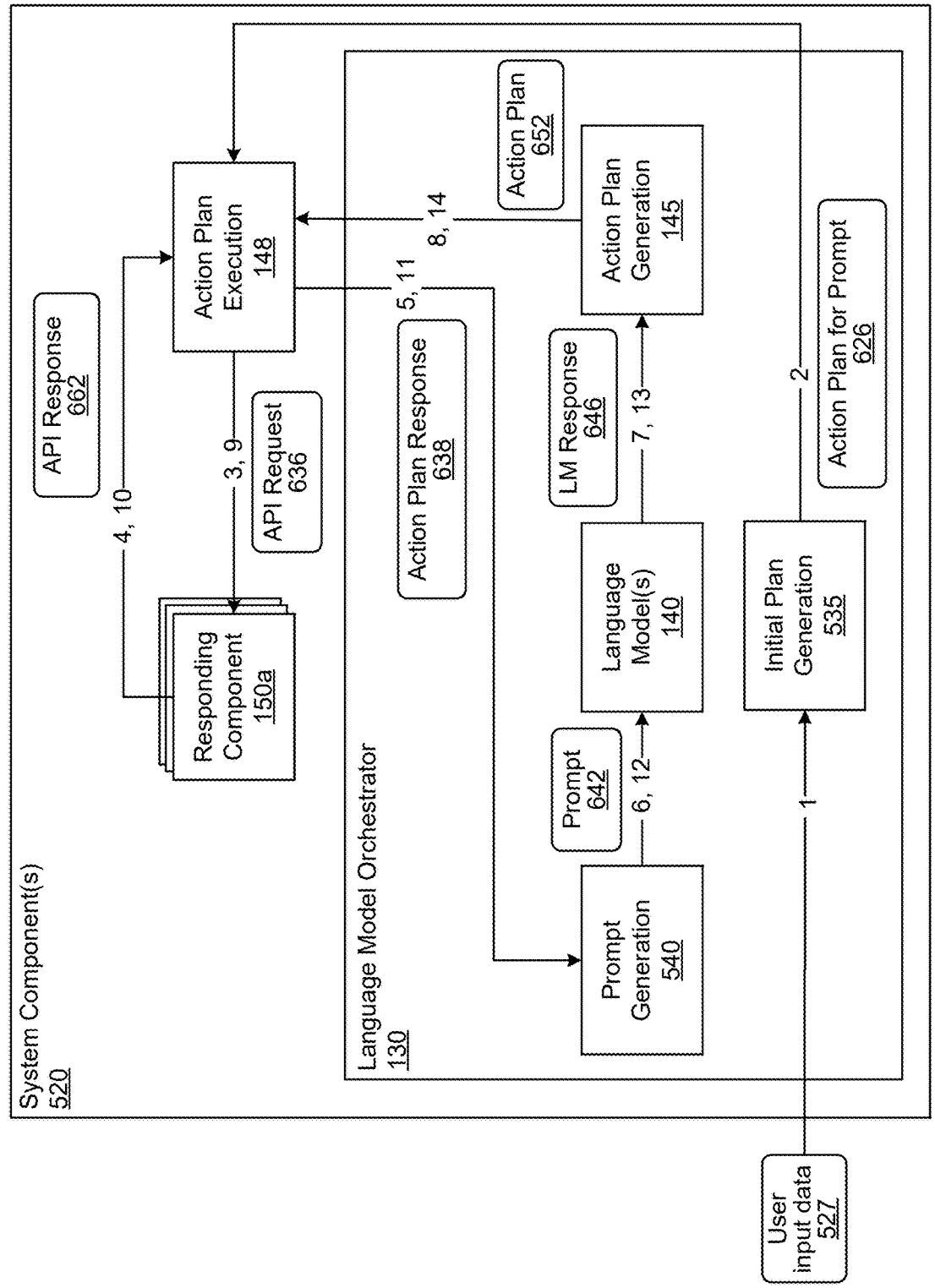
FIG. 6 is a conceptual diagram illustrating example processing of the system configured to use a language model, according to embodiments of the present disclosure.

Further details regarding the language model orchestrator component 130, the language model 140, the action plan generation component 145, the action plan execution component 148 and the responding components 150 are described in relation to FIGS. 5 and 6.

Referring to FIG. 1B, the supplemental content sourcing component 110 may process the candidate supplemental content 155 and the LM candidate supplemental content 156 to determine which supplemental content is to be stored, where such determination may be made based on aggregating the content results and validating the results. In some embodiments, the supplemental content sourcing component 110 may include a content aggregation component 160 and a validation component 165.

The content aggregation component 160 may be configured to aggregate, rank and/or shortlist the candidate supplemental content 155. The candidate supplemental content 155 may be associated with a rank or score representing a likelihood of the respective content corresponding to (e.g., matching) the search query sent to the content provider 152 that provided the content. The content aggregation component 160 may select the top N results from the candidate supplemental content 155, where the selection may be based on the respective ranks or scores. In some embodiments, the content aggregation component 160 may aggregate content results from an individual content provider 152 (or across content providers 152) determined using different search techniques (e.g., first set of results based on text-based search, second set of results based on vector-based search, etc.), where same or similar content results may be aggregated or combined into a single instance of aggregated candidate supplemental content 162a. In some embodiments, for the LM candidate supplemental content 156, the content aggregation component 160 may aggregate same or similar content results into a single instance of aggregated candidate supplemental content 162a. The content determined by the content aggregation component 160 may be included in aggregated candidate supplemental content 162.

The validation component 165 may determine whether the aggregated candidate supplemental content 162 corresponds to the content search query 142. (As opposed to the search query sent to the content provider 152, which is considered by the content aggregation component 160.) The validation component 165 may determine whether the candidate supplemental content from the content providers 152 are relevant to the intent of the search queries (e.g., enriched queries) making up the content search query 142. In some embodiments, for the LM candidate supplemental content 156, included or represented in the aggregated candidate supplemental content 162, the validation component 165 may determine whether the language model generated content corresponds to the user affinity data 105 or one or more of the entities 120. The validation component 165 may determine a relevancy score (e.g., a likelihood of the aggregated candidate supplemental content 162a matching the content search query 142, the user affinity data 105 and/or the entities 120) or a relevancy indicator (e.g., a Boolean value, such as true or false, indicating whether an instance of aggregated candidate supplemental content 162a matches the content search query 142, the user affinity data 105, and/or the entities 120).

In some embodiments, the validation component 165 may include a machine learning model(s) that is trained to compare aggregated candidate supplemental content 162 with the content search query 142 to determine the relevancy score or the relevancy indicator. The machine learning model(s) may be trained using sample supplemental content and corresponding content search queries to learn mappings between content results and search queries. In other examples, the machine learning model(s) may use a neural-based technique (e.g., a cosine distance similarity measure) to determine whether an instance of aggregated candidate supplemental content 162 corresponds to the content search query 142.

In some embodiments, the validation component 165 may include a language model (or may prompt the language model 140) to determine whether aggregated candidate supplemental content 162 corresponds to the content search query 142. In examples, the prompt may include exemplars including one or more instances of sample supplemental content and one or more corresponding content search queries so that the model can learn mapping patterns among them, and then generate a response representing whether or not an instance of aggregated candidate supplemental content 162 corresponds to the content search query 142. In some examples, the language model may use its parametric knowledge to generate a response representing whether or not aggregated candidate supplemental content 162a corresponds to the content search query 142.

The validation component 165 may determine that an instance of aggregated candidate supplemental content 162 is "valid" (i.e., corresponds to the content search query 142) and may output validated supplemental content 168 corresponding to the instance of aggregated candidate supplemental content 162. In some embodiments, the validation component 165 may output a validation report 166, which may include the relevancy score or indicator corresponding to the individual aggregated candidate supplemental content 162. In some embodiments, the validation component 165 may be configured to determine a reason for why an aggregated candidate supplemental content 162a corresponds to the content search query 142. For example, if the content search query 142 includes a search query "yoga mat", and the aggregated candidate supplemental content includes "[brand name] yoga mats for women and men, anti-slip, medium thickness", then the validation component 165 may determine a relevancy indicator of "true" and the reason to be "This product is a yoga mat that directly matches the query." As another example, if the content search query 142 includes a search query "[brand name] yoga mat", and the candidate supplemental content includes "colorful graphics yoga mat, grey pattern, high density, large size", then the validation component 165 may determine a relevancy indicator of "false" and the reason to be "This product is a yoga mat but does not specify [brand name] included in the query."

The validated supplemental content 168 may be stored in a sourced supplemental content storage 170 and may be associated with a user profile identifier for the user associated with the user affinity data 105. As such, the sourced supplemental content storage 170 may include personalized and relevant supplemental content for the user that is "sourced" by using a language model-based system to query content providers for the stored supplemental content.

FIG. 2 is a flowchart illustrating an example process for determining supplemental content based on user profile data, according to embodiments of the present disclosure. The example process may be performed using one or more components shown in FIGS. 1A-1B. Other embodiments may involve fewer or more steps than shown in FIG. 2.

At a step 202, the supplemental content sourcing component 110 may determine one or more entities (e.g., the entities 120) related to user profile data (e.g., the user affinity data 105) associated with a user (e.g., as described above in relation to FIG. 1A). For example, example user affinity data 105 may include "The user is interested in yoga" and corresponding example entities 120 may include: {'yoga', 'meditation', 'fitness', 'health and wellness'}. As another example, example user affinity data 105 may include "The user watches [sport teams] games" and corresponding example entities 120 may include: {' [sports team]', '[sports type]', '[division name]', '[championship game name]'}.

At a step 204, the supplemental content sourcing component 110 may determine a prompt (e.g., the prompt 135) including a request to generate one or more initial queries for each determined entity 120 and for at least one content provider 152. The prompt 135 may include other information as described above in relation to FIG. 1A. For example, an example prompt 135 may include: "Generate three queries for each of the following entities: 'yoga', 'meditation', 'fitness', 'health and wellness'. Generate a query for the following content providers: Amazon Shopping, Prime Video and Kindle." As another example, an example prompt 135 may include: "Generate two queries for each of the following entities: {'[sports team]', '[sports type]', '[division name]', '[championship game name]'. Generate a query for the following content providers: Prime Video, [events ticketing application], Amazon Shopping."

At a step 206, the supplemental content sourcing component 110 may determine the prompt 135 to include to a request to generate one or more enriched queries based on the one or more initial queries. In example embodiments, steps 204 and 206 may be performed at substantially the same time and may result in one prompt for the language model. The prompt 135 may be determined as described above in relation to FIG. 1A. An example prompt 135 may further include: "After generating the queries, enrich the generated queries by adding to or modifying the query with well-known information for the entity type or the content provider. For a product-based query for shopping, enrich the query with well-known brand names for the product. For a query involving a sports team, enrich the query with well-known team or sports players."

At a step 208, the language model orchestrator component 130 may process the prompt 135 using a language model (e.g., the language model 140) to generate the one or more enriched queries. As described above, the language model 140 may generate model output data including other information such as the initial queries, rationales for the initial queries, and rationales for the enriched queries. Example model output data generated by the language model 140 may include:

---

{
Query: "Yoga mat" for content provider Amazon Shopping.
Rationale: Retrieve yoga mats from Amazon shopping since user has an affinity for yoga.
Enriched Query: for Amazon Shopping "[first brand name] yoga mats", "[second brand name] yoga mats", "[third brand name] yoga mats".
Query: "Yoga instructional videos" for content provider Prime Video
Rationale: Retrieve instructional yoga videos on Prime Video to learn new poses and routines.
Enriched Query: for Prime Video "Yoga for dummies", "30-day yoga challenge".
Query: "Yoga journaling books" for content provider Kindle
Rationale: Retrieve ebooks for journaling yoga practice and progress on Kindle.
Enriched Query: for Kindle "Yoga Journal", "Yoga Diary", "Yoga Body Diet".
}

---

40

Another example model output data generated by the language model 140 may include:

---

{

Query: "[sports team] jersey" for content provider Amazon Shopping

Rationale: Retrieve [sports team] jersey and apparel from Amazon shopping since user has an affinity for [sports team]

Enriched Query: for Amazon Shopping "[sports team] jersey [championship year]", "[sports team] jersey for [popular team player]."

Query: "[sports type] documentaries" for content provider Prime Video

Rationale: Retrieve [sports type] documentaries from Prime Video since user likes [sports team].

Enriched Query: for Prime Video "[sports team] documentary", "[sports team] championship game", "[popular team player] for [sports type]."

Query: "[sports type] events" for event ticketing application

Rationale: Retrieve sporting events since user has an affinity for [sports teams].

Enriched Query: for Event ticketing application "[sports type] events near [user location]", "[sports team] events", "[sports type] events in next 30 days."

}

At a step 210, the language model orchestrator component 130 may send, to one or more of the content providers 152, search requests based on the enriched queries. As described above in relation to FIG. 1A, the language model orchestrator component 130 may determine API requests/calls based on the enriched queries generated by the language model 140 and the API requests/calls may be sent by the action plan execution component 148 to the appropriate content providers 152. For an example enriched query "[first brand name] yoga mats" for Amazon Shopping, an example API request may include "AmazonShopping. Search (product: "[first brand name] yoga mats." For an example enriched query for Prime Video "[sports team] documentary", an example API request may include "PrimeVideo. Search (title: "[sports team] documentary").

At a step 212, the supplemental content sourcing component 110 may aggregate candidate supplemental content received from the content provider(s) 152 in response to the search requests (as described in relation to FIG. 1B). In some embodiments, the supplemental content sourcing component 110 may aggregate results from different search techniques used by the content providers 152.

At a step 214, the supplemental content sourcing component 110 may determine validated supplemental content based on whether the aggregated candidate supplemental content corresponds to the search requests (as described in relation to FIG. 1B). At this step, the system may determine supplemental content that is relevant to the user's interests or affinities, to ensure that the user receives/is provided with relevant and personalized supplemental content.

At a step 216, the supplemental content sourcing component 110 may store validated supplemental content for future presentation to the user. The supplemental content that is stored (e.g., at the sourced supplemental content storage 170) may be determined to be relevant and personalized for the user based on user interests and affinities. One or more of the stored supplemental content may selected for presentation as described below in relation to FIGS. 3-4.

In a non-limiting example, the language model 140 may be prompted with the user affinity data 105 and the entities 120 to determine supplemental content corresponding to the entities from one or more content providers, and to determine supplemental content that corresponds to a user device's output capabilities (e.g., device with display, device without display, web/mobile application, etc.). For such examples, an example prompt 135 to the language model 140 may include: "User owns a Echo Show 15, has purchased two sports biographies on Kindle: "[first book title]" and "[second book title]", in the last 30 days. He follows [sports team] for score updates and asked Alexa this morning "who did [sports team] draft yesterday?", which shows an avid fan of the [sports team]. Provide 2 kindle book recommendations that this user will like or be interested in, focusing on his interests in sports biographies and the [sports team]. Provide following attributes for the book recommendations: 1) Book title, 2) Author, 3) Rating, 4) Book Image in PNG, and 5) Action button with payload that enables user to purchase the book. Format the returned content for Echo Show 15 presentation application."

Figure 3:
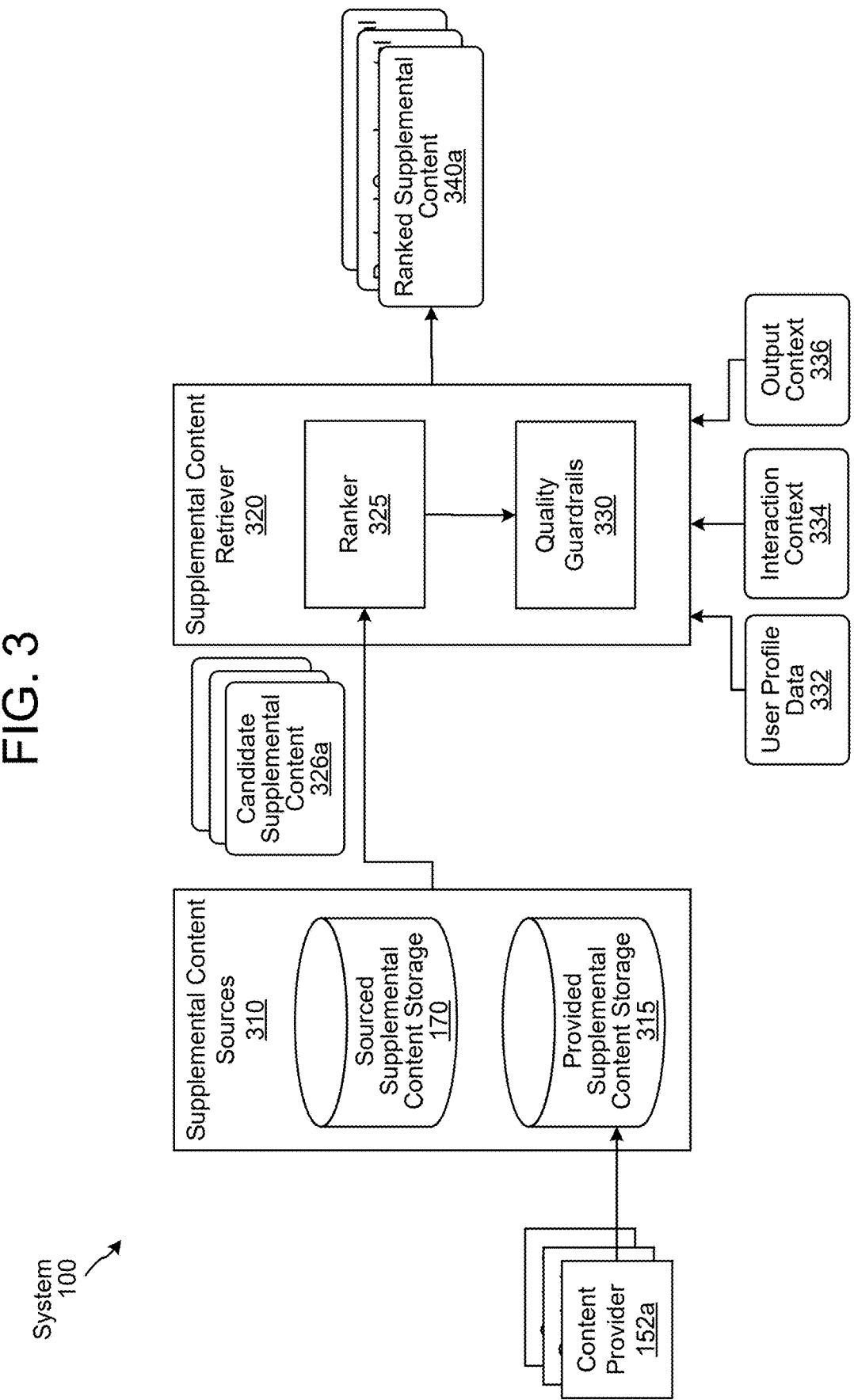
FIG. 3 is a conceptual diagram illustrating example components and processing of the system to retrieve supplemental content for output for a user, according to embodiments of the present disclosure.

FIG. 3 is a conceptual diagram illustrating example components and processing of the system 100 to retrieve supplemental content for output, according to embodiments of the present disclosure. The system 100 may include one or more supplemental content sources 310. In example embodiments, the supplemental content sources 310 may include the sourced supplemental content storage 170 that stores supplemental content determined to be relevant and personalized for a user, as described in relation to FIGS. 1A, 1B and 2. In some embodiments, the supplemental content sources 310 may include provided supplemental content storage 315 that may store supplemental content provided by one or more of the content providers 152. In some examples, the content providers 152 may determine supplemental content, which may be relevant for the user (e.g., based on the user's interests, affinities, user interactions, user feedback, etc.), including content that the content provider 152 is configured to "surface" or "push." Examples of such supplemental content include, but is not limited to, new product/service information, product/service discounts or sales, new or updated application features, trending news, geographically local information, emergency information, severe weather information, information related to recently purchased products/service, newly added media titles, new book releases, content describing (e.g., promoting) a particular product, service or other item, advertising or other sponsored content, etc. In some examples, the content providers 152 may determine supplemental content relevant for the user based on the user affinity data 105 and/or other information related to the user (e.g., purchase history, search history, user preferences and interests, media consumption history, past interactions, etc.). In some embodiments, the provided supplemental content storage 315 may store supplemental content associated with the user profile identifier for the user.

In some embodiments, the supplemental content sources 310 may store supplemental content corresponding to more than one user, for example, users of the same account. An (system or AI assistant) account may be associated with more than one user. For example, an account may be associated with all users of a household, an account may be associated with users of an organization/company team, an account may be associated with users of a vehicle, an account may be associated with users of the same user device, etc.

In some embodiments, the supplemental content sources 310 may include a vector database that may store supplemental content based on semantic meaning (e.g., semantically similar content may have vectorized representations/embeddings that are similar or clustered within a vector/embedding space).

The system 100 may include a supplemental content retriever component 320 that may be configured to retrieve supplemental content for output to the user. In some embodiments, the supplemental content retriever component 320 may process in response to receiving a request (e.g., an action request, an API request/call, etc.). In some embodiments, the supplemental content retriever component 320 may receive one or more inputs based on which the supplemental content is determined. In examples, the inputs may include user profile data 332, interaction context 334 and output context 336. The user profile data 332 may include a user profile identifier for the user (for whom supplemental content is to be output), account identifier, user preferences, user demographics, etc. The user profile data 332 may be stored at the profile storage 770. The interaction context 334 may include interaction patterns, situational context, task plans and needs (details on task plans and needs are described in relation to FIG. 4A, which may be determined and provided by the task plans component 415 and the PKS component 410 respectively). The output context 336 may include device type for the user device to output the supplemental content and fulfillment type (when the content is to be output, for example, during an on-going interaction/dialog, after the interaction has ended/completed, during an "ambient" experience including presentation via a home screen or page, via a notification or message, etc.).

The supplemental content retriever component 320 may search the supplemental content sources 310 for candidate supplemental content 326 corresponding to the received inputs: the user profile data 332, the interaction context 334 and the output context 336. In some embodiments, the supplemental content retriever component 320 may use a neural-based searching/retrieval technique to determine the candidate supplemental content 326.

In some embodiments, a ranker 325, included in the supplemental content retriever component 320 may process the candidate supplemental content 326. The ranker 325 may be configured to provide a ranked list of personalized supplemental content based on content level ranking. In some embodiments, the ranker 325 may include a runtime decision engine that receives candidate supplemental content 326, ranks the candidate supplemental content 326 based on one or more factors, enforces guardrails (e.g., adaptive "backoff" or "dial down" based on topic level feedback), and implements policy overrides (e.g., provide higher weightages for shopping deals during limited-time events). For supplemental content ranking, the ranker 325 may query or otherwise retrieve information from one or more services/components. One service/component may provide personalized context for the user including interests, affinities, etc., such as information that may be included in the user affinity data 105. Another service/component may provide event timeline data including user inputs, system actions, system outputs, etc. corresponding to one or more interactions between the user and the system, in a timeline format. Yet another service/component may provide feedback data including explicit user feedback, implied user feedback, system-determined feedback, etc. corresponding to supplemental content that was presented previously to the user or a different user(s).

The ranker 325 may rank the candidate supplemental content 326 based on the personalized context, event timeline data, and/or feedback data. In some embodiments, the ranker 325 may rank the candidate supplemental content 326 based on the user profile data 332, the interaction context data 334 and/or the output context 336. In some embodiments, the ranker 325 may rank the candidate supplemental content 326 based on user feedback, device type for the device outputting the content, device or user location, sponsorship or monetization opportunities, etc. In some embodiments, the ranker 325 may extract features (e.g., entities, topic, etc.) corresponding to an on-going interaction, and may use the extracted features to rank the supplemental content. The ranker 325 may be configured to rank the candidate supplemental content 326 based on its relevancy to the user and a current situation of the user (or a situation when the content may be presented). In some embodiments, the ranker 325 may rank the candidate supplemental content 326 based on task plans that may be determined for the user by the task plans component 415. Details on task plans are described below in relation to FIG. 4A.

In some embodiments, the ranker 325 may include a machine learning model(s) to rank the candidate supplemental content 326 based on one or more factors described above. The machine learning model(s) may be configured using unsupervised learning techniques, supervised learning techniques or semi-supervised learning techniques.

In some embodiments, the supplemental content retriever 320 may be configured to perform automatic re-training of the ranker 325 to ensure the ranker's relevancy of content in response to new signals and world events. User engagement with outputted supplemental content may be used to re-train the ranker 325. User engagement may include a user selecting the outputted supplemental content (e.g., via touch screen tap, voice input selection, etc.) or a user viewing the outputted supplemental content (e.g., user gaze).

In some embodiments, the ranker 325 may rank the candidate supplemental content 326 to implement adaptive back-off, which may be based on user feedback related to a topic, a manner in which the supplemental content is presented, etc. Adaptive back-off may involve the system presenting fewer supplemental content for a particular topic, via a particular output interface, at a particular time, etc. For example, the user may provide negative feedback with respect to supplemental content presented during an on-going interaction, and the system may not present supplemental content during on-going interactions in the future or may present supplemental content fewer times during future on-going interactions.

A quality guardrails component 330, included in the supplemental content retriever component 320, may determine whether the candidate supplemental content 326 corresponds to one or more guardrails. In some embodiments, the quality guardrails component 330 may apply content moderation techniques to determine whether the candidate supplemental content 326 corresponds to inappropriate content (e.g., profanity, violent content, harmful content, biased content, adult content, etc.). In some embodiments, the quality guardrails component 330 may determine whether the candidate supplemental content 326 is appropriate for output for the user. For example, the quality guardrails component 330 may determine whether the user can access the supplement content (e.g., has the appropriate subscriptions, the corresponding application is installed at the device, etc.), whether the user device is capable of outputting the supplemental content (e.g., output capabilities, device mode settings (e.g., do not disturb, screen-off, etc.), child device, etc.), and the like.

Based on ranking and/or applying guardrails, the supplemental content retriever component 320 may output ranked supplemental content 340. The ranked supplemental content 340 may be a portion/subset of the candidate supplemental content 326. The ranked supplemental content 340 may be provided to another system component that may select supplemental content from the ranked supplemental content 340 and may cause output of the selected supplemental content.

In some embodiments, the supplemental content retriever component 320 may receive a request from another system component (e.g., an application, a skill, a domain, an orchestrator component 730, the language model orchestrator component 130 during the process shown in FIG. XXU, etc.) to retrieve supplemental content for a particular user interaction/situation (e.g., indicated by the user profile data 332, the interaction context 334, the output context 336). In response to the request, the supplemental content retriever component 320 may output and send the ranked supplemental content 340 to the requesting system component. In example embodiments, prior to sending the ranked supplemental content 340 to the requesting system component, the system may process the ranked supplemental content 340 using another system component (e.g., a presentation adapter component). The presentation adapter component may be configured to transform one or more of the ranked supplemental content 340 for presentation via the user device for the user. For example, the ranked supplemental content 340 may be modified (e.g., transformed, augmented, updated, etc.) so that it can be outputted using one or more capabilities of the user device 510. In examples, the ranked supplemental content 340 may be modified for presentation as synthesized speech, for display via device screen, for output as a notification, for output as a message, etc. The presentation adapter component may use the output context 336 to modify the ranked supplemental content 340. After modifications, the modified ranked supplemental content may be sent to the requesting system component.

Figure 4B:
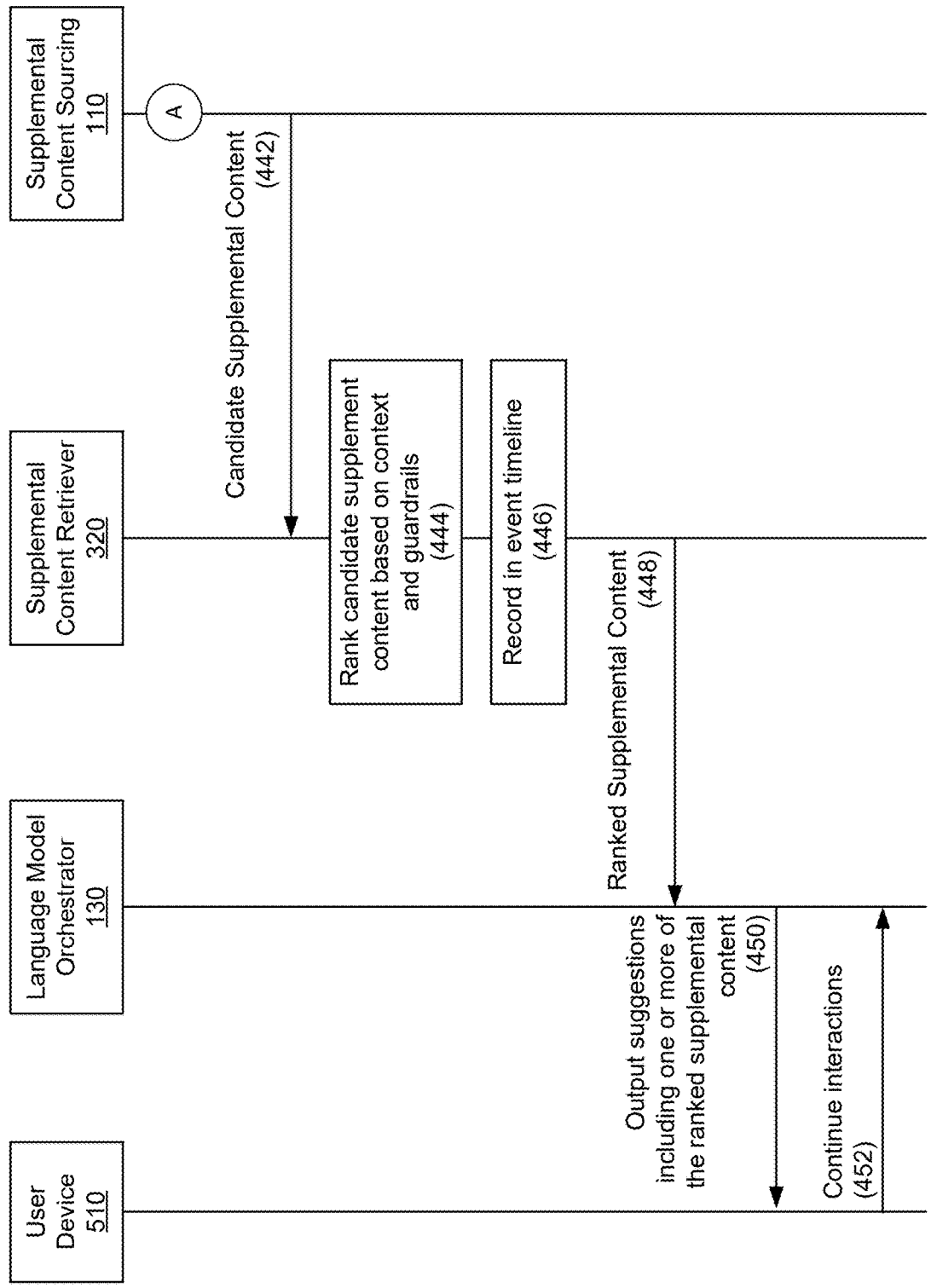

In some embodiments, the system may use the language model orchestrator component 130 and other components to process user inputs (e.g., user input data 527) and generate responses to the user inputs as described in relation to FIGS. 5 and 6. During such interactions (e.g., an on-going dialog or conversation), the system may present supplemental content (e.g., in-conversation supplemental content). FIGS. 4A-4B are a signal flow diagram illustrating example processing for determining supplemental content for in-conversation output, according to embodiments of the present disclosure.

Referring to FIG. 4A, the user, via a user device 510, may send user interactions (e.g., user inputs) (430) to the language model orchestrator component 130. During the interactions, the language model orchestrator component 130 may determine that supplemental content is to be outputted; based on this determination the language model orchestrator component 130 may send an API call to get/obtain supplemental content (432) to the supplemental content retriever component 320. In examples, the API call may include data representing the interactions (e.g., user inputs, system/language model outputs, actions performed, APIs called, conversation topic, etc.), a user profile identifier associated with the user, and other information.

In some embodiments, the supplemental content retriever component 320 may determine placement data and conversation features (434) based on receiving the API call. The conversation features may include entities, topic(s), etc. corresponding to the on-going interactions between the user and the system/the language model orchestrator component 130. The placement data may represent when and how the supplemental content is to be presented to the user. For example, the placement data may indicate that the supplemental content is to be presented as natural language output (e.g., displayed text, synthesized speech, etc.) during the on-going conversation (e.g., a dialog output from the system), that the supplemental content is to be presented as a notification via the user device 510 or another user device associated with the user profile identifier, that the supplemental content is to be presented after the on-going conversation is completed, etc.

The supplemental content retriever component 320 may send a request to get needs (436) to a personalized knowledge service (PKS) component 410. The PKS component 410 may be configured to determine and store various information related to the user 505 that may indicate the user's affinities, interests, preferences, etc. In some embodiments, the PKS component 410 may determine the user affinity data 105. The PKS component 410 may store the information using a data structure (e.g., a data graph, a directed graph, etc.) so that information may be retrieval in an efficient manner, including information that may be a high-level topic/category and information that may be more detailed. The PKS component 410 may receive data from various system components, where such data may include user profile data, user indicated preferences/interests, interactions data, user devices, user locations, etc. In some embodiments, the PKS component 410 may determine relationships between instances of information using the received data. In some embodiments, the PKS component 410 may determine the relationships based on information relating to other users that may be similar or like the user 505. In some embodiments, the PKS component 410 may include or may be in communication with a personalized context component 565. In response to the request for needs, the PKS component 410 may determine and send "needs" data representing one or more interests, affinities or preferences associated with the user 505. In some embodiments, the PKS component 410 may use the conversation features (e.g., information related to the current on-going interactions) to determine the needs data. For example, if the current on-going interactions are related to music, then the PKS component 410 may determine needs data indicating music-related interests, affinities or preferences for the user 505.

The supplemental content retriever component 320 may send a request to get task plans (438) to a task plans component 415. In some embodiments, the task plans component 415 may be configured to determine one or more task plans for the user 505, where a task plan may indicate a "plan" (e.g., recommendation, suggestion, etc.) for presenting supplemental content to the user 505. The task plan may represent what, how and when supplemental content is to be presented (or should ideally be presented) to the user 505. The task plans component 415 may determine the task plan(s) during offline operations based on various data inputs, including but not limited to, past interactions data, user interactions/engagement with past supplemental content, user feedback for past supplemental content, user routines (e.g., frequent interactions during particular times or days), and the like. In example embodiments, the task plan may be associated with a particular domain, skill/application, topic or category (e.g., music domain, health/wellness category, shopping domain, etc.). An example task plan may indicate that supplemental content related to health/wellness category is to be presented to the user 505 during morning times via a particular user device type (e.g., smart TV, device with a display screen, etc.). In response to the request for task plans, the task plans component 415 may determine and send task plans data including one or more task plans associated with the user 505. In some embodiments, the task plans component 415 may use the conversation features (e.g., information related to the current on-going interactions) to determine the task plans data. For example, if the current on-going interactions are related to music, then the task plans component 415 may determine task plans data associated with the music domain or music category.

The supplemental content retriever 320 may send a request to get supplemental content based on conversation features, needs and task plans (440) to the supplemental content sourcing component 110. The supplemental content sourcing component 110 may determine supplemental content results/candidates as described in relation to FIGS. 1A, 1B and 2 (e.g., using the language model orchestrator component 130 to determine search requests for various content providers to retrieve candidate supplemental content; aggregating supplemental content results; validating supplemental content against a query generated by the language model 140; etc.).

Referring to FIG. 4B, the supplemental content sourcing component 110 may return candidate supplemental content (442) to the supplemental content retriever component 320. The candidate supplemental content may include content determined per step 440 by the supplemental content sourcing component 110.

The supplemental content sourcing component 110 may rank the candidate supplemental content based on context and guardrails (444). The candidate supplemental content being ranked may include the content provided in step 442 and/or content provided by the content providers 152 (stored in the provided supplemental content storage 315 as described in relation FIG. 3). The candidate supplemental content may be ranked as described in relation to FIG. 3 based on user profile data 332 associated with the user of this interaction, interaction context 334 corresponding the on-going conversation and output context 336.

The supplemental content sourcing component 110 may record in the event timeline (446) that the ranked supplemental content is being provided to the language model orchestrator component 130. Such recording may be used by the system to determine feedback data corresponding to the supplemental content, user engagement data corresponding to the supplemental content, and other information that may be used to re-train/update one or more of the system components (e.g., the ranker 325, the supplemental content sourcing prompt generation component 127, etc.).

The supplemental content sourcing component 110 may send the ranked supplemental content (448) to the language model orchestrator component 130. The language model orchestrator component 130 may output suggestions including one or more of the ranked supplemental content (450). The suggestions may be outputted during the on-going conversation and as a system output during the dialog. The user device 510 may continue interactions (452) with the language model orchestrator component 130, where the continued interactions may involve the user selecting the outputted suggestions, providing additional user inputs unrelated or related to the suggestions, providing additional user inputs continuing the conversation, etc.

FIG. 5 illustrates further example components included in the system 100 configured to use a language-model based approach to determine an action to be performed in response to a user input and determine a response to be presented to a user 505. As shown in FIG. 5, the system 100 may include a user device 510, local to the user 505, in communication with one or more system component(s) 520 via a network(s) 199. The network(s) 199 may include the Internet and/or any other wide-or local-area network, and may include wired, wireless, and/or cellular network hardware.

In some embodiments, the system component(s) 520 may include various components that may support processing by a language model, such as a language model orchestrator component 130. In example embodiments, the language model orchestrator component 130 may include an initial plan generation component 535, a prompt generation component 540, at least one language model 140, and an action plan generation component 145. The system component(s) 520 may further include an action plan execution component 148 configured to facilitate/cause performance of actions that may be determined by the language model 140. The system component(s) 520 may further include one or more responding components 150 that may perform the actions.

The responding components 150 may be configured to perform an action related to a user input, including, but not limited to retrieving information potentially relevant for determining a response to the user input (e.g., data from a knowledge base, Internet search, database, an application, etc.; context related to the interaction; relevant exemplars for a prompt to the language model; relevant application programming interfaces (APIs); etc.), operating a user device (e.g., a smart home device such as a TV, lights, a kitchen appliance, etc.), determining a synthesized speech output, or other actions described herein. As shown in FIG. 5, the responding components 150 may include an API retriever component 542 (further described below), a synthesized speech generation (SSG) component 556, one or more skill/app components 554 and other components described herein.

APIs are a way for one program/component to interact with another. API calls are a mechanism by which the program/component interact. An API call, or API command, is a message sent to a system component asking an API to perform an action, provide a service or information, or the like. An API call may be formatted for the particular API and may include a particular command, optionally using particular arguments and argument values. API calls may be used for a variety of purposes, such as controlling other devices (e.g., an API call of turn_on_device (device="indoor light 1") corresponds to a command for a component to turn on a device associated with the identifier "indoor light 1"), obtaining information from other components (e.g., an API call of InfoQA.question ("Who is the president of USA?") corresponds to a command for a component to find and provide an answer to the indicated question), and performing other actions (e.g., generating synthesized speech, searching data sources, etc.). The system 100 may interact with the responding components 150 via API calls.

The language model orchestrator component 130 may be configured to orchestrate processing by the language model 140. In some embodiments, the language model 140 may be configured to perform one or more stages of processing, which may be referred to as a task generation stage, an action (or directive) generation stage, and a response generation stage.

The processing stages may be performed in a particular order. For example, during a first stage of processing, the language model 140 may be tasked with performing task generation to generate a list of tasks to be performed in order to respond to a user input. During a second stage of processing, based on the list of tasks, the language model 140 may be tasked with performing action generation to generate action requests (or directives) for a responding component(s) 150 to perform an action(s) related to the tasks/user input. During a third stage of processing, based on information received from the responding component(s) 150, the language model 140 may be tasked with generating a response to the user input and/or causing a component(s) of the system 100 to perform further action(s). Further details are described herein in relation to FIG. 6.

In some cases, a subset of the stages may be performed. For some user inputs, the language model 140 may only perform the task generation stage and the response generation stage, where a response to a user input is generated by the language model 140 using parametric knowledge. For example, for a user input "What kind of fruit is lemon?", the language model 140 may determine that the task is to answer the user's question and may generate a response "Lemon is a citrus fruit that grows on tress" based on the model's parameter knowledge learned during configuration/training operations. In such examples, the language model 140 may not determine an action that is to be performed using a system component, such as sending a request for information to a knowledge base (e.g., the language model 140 may respond without using external knowledge).

In some embodiments, the system may use Retrieval-Augmented Generation (RAG) techniques to inform processing of a language model. RAG techniques may involve referencing an authoritative knowledge base or other type of data source outside of the model's training data sources before generating a response by the model. RAG techniques may extend the already powerful capabilities of language models to specific domains, an organization's internal knowledge base, etc., without the need to retrain the model. In some embodiments, information (e.g., relevant facts, up-to-date information, current/trending topics, etc.) from one or more components (e.g., responding component(s) 150) may be provided to the language model 140 and the model may generate a output based on the received information.

In some embodiments, the language model orchestrator component 130 may be configured to orchestrate processing by multiple different language models, where an individual language model may perform one (or more) of the processing stages described above. For example, a first language model may perform task generation, a second language model may perform action generation, and a third language model may perform response generation. In some embodiments, the language models may be different types of models, for example, a first language model may be a text-to-text generative model, a second language model may be a multi-modal generative model, a third language model may be a text-to-speech generative model, etc. In some embodiments, the language models may be different sizes (e.g., number of parameters), may have different processing capabilities, etc.

Some embodiments may enable use of other components, such as plugins, with the language model 140, where the plugins may add functionality and features to the language model capabilities. For example, the plugins may be used to perform mathematical calculations (e.g., a calculator plugin), statistical analysis (e.g., a statistics plugin), natural language translation, speech generation, etc. For further example, the plugins may additionally, or alternatively, be used to perform an action responsive to a user input based on the response generated by the language model. As a further example, the plugins may cause the language model to process and output according to an enabled plugin, which may result in a different response, reasoning, processing, etc. from the language model than when the plugin is not enabled. In some cases, a user or a system may enable a plugin(s) for use with the language model.

The system component(s) 520 may include other processing components configured to process user inputs and other type of inputs (e.g., sensor data, audio data, data indicative of an event occurring, etc.) received via the user device 510. In example embodiments, the system component(s) 520 may process spoken inputs using ASR processing. The system component(s) 520 may also be configured to process non-spoken inputs, such as gestures, textual inputs, selection of GUI elements, selection of device buttons, etc. The system component(s) 520 may also include other components to understand an input, determine an action to be performed in response to receiving the input, generate an output responsive to the input, and the like. Such other components may perform natural language processing, SSG processing, etc., some of which are described herein in relation to FIG. 7.

As shown in FIG. 5, the system component(s) 520 may receive user input data 527, which may be provided to the language model orchestrator component 130 (as shown in FIG. 6). In some instances, the user input data 527 may include one or more types of data, such as text (e.g., a text or tokenized representation of a user input), audio, image, video, etc. Such data may be encoded/embedded data that represent the underlying type of data (e.g., text, audio, image, etc.). For example, the user input data 527 may include text (or tokenized) data when the user input is a natural language user input. In some embodiments, an ASR component 750 of the system 100 may receive audio data representing a spoken natural language user input from the user 505. The ASR component 750 may perform ASR processing on the audio data to determine ASR data representing the spoken user input, which may correspond to a transcript of the user input. As described herein, with respect to FIG. 7, the ASR component 750 may determine ASR data that includes an ASR N-best list including multiple ASR hypotheses and corresponding confidence scores representing what the user may have said. The ASR hypotheses may include text data, token data, ASR confidence score, etc. as representing the input utterance. The confidence score of each ASR hypothesis may indicate the ASR component's 750 level of confidence that the corresponding hypothesis represents what the user said. The ASR component 750 may also determine token scores corresponding to each token/word of the ASR hypothesis, where the token score indicates the ASR component's 750 level of confidence that the respective token/word was spoken by the user. The token scores may be identified as an entity score when the corresponding token relates to an entity. In some instances, the user input data 527 may include a top scoring ASR hypothesis of the ASR data. As an even further example, in some embodiments, the user input may correspond to an actuation of a physical button, data representing selection of a button displayed on a graphical user interface (GUI), image data of a gesture user input, combination of different types of user inputs (e.g., gesture and button actuation), etc. In such embodiments, the system 100 may include one or more components configured to process such user inputs to generate the text or tokenized representation of the user input (e.g., the user input data 527). As a further example, the user input data 527 may include image data (e.g., image data 721) representing information being displayed at the user device 510 (e.g., on-screen context data) when the user 505 provides the user input or at substantially the same time as the user 505 provides the user input. As yet a further example, the user input data 527 may include audio data representing audio signals (e.g., background noise, audio from other devices such as TV, appliances, etc.) occurring in the environment of the user 505 that can be captured by the user device 510 (e.g., audio environment context). As yet a further example, the user input data 527 may include image data representing one or more objects in the environment of the user 505 (e.g., visual environment context). As yet a further example, the system may receive image data including text (and other data), and the user input data 527 may include text determined from the image data using optical character recognition or other techniques.

In some embodiments, the system component(s) 520 may receive input data that may not be provided directly/explicitly by a user. Such other type of input data may be processed in a similar manner as the user input data 527 as described herein. Such other type of input data may be received in response to detection of an event. Example events include change in a device state (e.g., front door opening, garage door closing, TV turned off, thermostat detecting a particular temperature, etc.), occurrence of an acoustic event (e.g., baby crying, appliance beeping, glass breaking, etc.), presence of a user (e.g., a user approaching the user device 510, a user entering the home, etc.), occurrence of an event indicated by a user (e.g., a reminder/notification requested by the user, sporting event score change, start of a TV program, calendar event, etc.), and others. In some embodiments, the system 100 may process the input data and generate a response/output. For example, the input data may be received in response to detection of a user generally or a particular user, an expiration of a timer, a time of day, detection of a change in the weather, a device state change, etc. In some embodiments, the input data may include data corresponding to the event, such as sensor data (e.g., image data, audio data, proximity sensor data, short-range wireless signal data, etc.), a description associated with the timer, the time of day, a description of the change in weather, an indication of the device state that changed, etc. The system 100 may include one or more components configured to process the input data to generate a natural language representation of the input data. The system 100, for example, the language model orchestrator component 130 may process the input data and may cause performance of an action. For example, in response to detecting a garage door opening, the system 100 may cause garage lights to turn on, living room lights to turn on, etc. As another example, in response to detecting an oven beeping, the system 100 may cause a user device 510 (e.g., a smartphone, a smart speaker, etc.) to present an alert to the user. The language model orchestrator component 130 may process the input data to generate tasks (e.g., an action plan) that may cause the foregoing example actions to be performed.

FIG. 6 illustrates example processing of the user input data 527 by the system component(s) 520 using the language model 140. Although the figure and discussion of the present disclosure illustrate certain components and steps in a particular order, the components may be implemented in a different manner (as well as certain components removed or added) and the steps described may be performed in a different order (as well as certain steps removed or added) without departing from the present disclosure.

In some embodiments, the language model 140 may perform iterative processing (e.g., multiple processing cycles, multiple processing stages, etc.) with respect to individual user input data 527. Such iterative processing is illustrated and described herein with respect to FIG. 6. For example, in a first iteration of processing the language model 140 may receive a first prompt from the prompt generation component 540, in response to which the language model 140 may determine one or more tasks to be performed with respect to the user input data 527, then at least one of the determined task(s) may be performed via the action plan execution component 148, the results of the performed task(s) may be provided to the language model 140 via a second prompt, in response to which the language model 140 may determine further tasks to be performed or may determine that a (final) response to the user input is determined.

The initial plan generation component 535 may be configured to determine various information relevant to processing of the user input data 527 by the language model orchestrator component 130. The initial plan generation component 535 may generate an action plan (e.g., action plan for prompt data 626) representing one or more tasks/actions to be performed to determine the various relevant information. The relevant information may be included in a prompt to the language model 140. The initial plan generation component 535 may receive (step 1) the user input data 527 representing a user input from the user 505. Based on the user input data 527, the initial plan generation component 535 may determine information relevant for processing the user input data 527 and may output (step 2) the action plan for prompt data 626. The action plan for prompt data 626 may include one or more tasks to be performed to retrieve the relevant information. The tasks may be represented as action descriptions, API requests/calls, API descriptions, requests to a component(s) (e.g., the responding components 150), and the like. Examples tasks that may be included in the action plan for prompt data 626 may relate to obtaining certain information like context data, user profile data, user preferences, available/relevant exemplars, available/relevant APIs, etc.

In example embodiments, the initial plan generation component 535 may determine one or more types of context data relevant for the user input data 527. Types of context data may include user context (e.g., user location, user profile identifier, user demographics, user profile data, user preferences, personalized catalogs, enabled skills/applications, etc.), device context (e.g., device type, device identifier, device location (e.g., living room, kitchen, office, etc.), device capabilities, device state, etc.), environmental context (e.g., time/date the past user input was received/processed, device that received the user input, device that responded to the user input, objects proximate to the device/user, background audio/noises, state/status of device(s) in the user's environment (e.g., TV is on, thermostat temperature, etc.), dialog context (e.g., prior user inputs of a dialog, prior system responses of the dialog, dialog topic, actions performed during the dialog, etc.), and the like. As an example, if the user input data 527 corresponds to operation of a device (e.g., the user input corresponds to a smart home domain), the initial plan generation component 535 may determine that device context information, in particular device states for the devices associated with the user/user profile of the user 505, may be relevant information. As another example, if the user input data 527 corresponds to output of media, such as music, movies, TV shows, etc., the initial plan generation component 535 may determine that user context information, in particular user preference for media genre associated with the user/user profile of the user 505, may be relevant information.

Based on the type of context data determined to be relevant, the initial plan generation component 535 may output the action plan for prompt data 626 to include a request for the type(s) of context data. For example, if device context is relevant information, then the action plan for prompt data 626 may include an API call/description corresponding to a component (e.g., a device state component, a smart home component, a user profile storage, etc.) capable of providing device information. As another example, if user context is relevant information, then the action plan for prompt data 626 may include an API call/description corresponding to a component (e.g., a user profile storage, a personalized context component, etc.) capable of providing user information.

In some embodiments, the initial plan generation component 535 may determine one or more components or types of components that may be relevant for processing the user input data 527. As an example, if the user input data 527 corresponds to operation of a device (e.g., the user input corresponds to a smart home domain), the initial plan generation component 535 may determine that components (e.g., APIs) corresponding to device operation or smart home domain may be relevant, and the initial plan generation component 535 may output the action plan for prompt data 626 to include device operation components or smart home domain components. As another example, if the user input data 527 corresponds to output of media, the initial plan generation component 535 may determine components corresponding to media output or music domain may be relevant, and the initial plan generation component 535 may output the action plan for prompt data 626 to include media output components or music domain components.

In some embodiments, the initial plan generation component 535 may determine a query to retrieve exemplars and/or APIs relevant for processing the user input data 527 using the language model 140. As used herein, an exemplar refers to information that may be included in a prompt to a language model that provides an example of how the language model is to process or respond, including, among other things, what actions the language model can request performance of. A prompt may include more than one exemplar. Few shot learning or in-context learning by the language model is enabled by including the exemplars in the prompt. The query (or request) to retrieve relevant exemplars and/or APIs may be included in the action plan for prompt data 626. The query (or an API request based on the query) may be processed by the responding component 150 (e.g., an exemplar retriever component, the API retriever component 542, etc.). The query, in some embodiments, may include the user input data 527 or a portion or representation thereof.

The initial plan generation component 535 may employ one or more techniques to determine relevant information or to determine the tasks to obtain relevant information. Examples of such techniques include using one or more of machine learning models (e.g., classifiers), statistical models, rules engines, etc. to determine the relevant information. The initial plan generation component 535 may determine a topic/category corresponding to the user input data 527, a (semantically or lexically) similar past user input and relevant information corresponding to the similar past user input, and the like.

In example embodiments, the initial plan generation component 535 may use a language model to determine the types of information relevant for processing the user input data 527. The initial plan generation component 535 may input a prompt to the language model, for example, "What types of information is relevant for responding to the user input: [user input data 527]", and the language model may output one or more types of context data, one or more types of components, etc. that may be relevant. In some embodiments, the initial plan generation component 535 may input a prompt to the language model 140 requesting relevant information for the user input data 527.

The action plan for prompt data 626, which includes types of relevant information for the user input data 527 or tasks to be performed to obtain the relevant information, may be processed by the action plan execution component 148 to retrieve the relevant information. The action plan execution component 148 may process the action plan for prompt data 626 to generate one or more requests to perform an action (e.g., API requests 636) for a particular responding component 150. For example, if the action plan for prompt data 626 indicates that device information/context is relevant, then the action plan execution component 148 may generate an API request 636 for a responding component 150a capable of providing the device information, where the API request 636 may include a user profile identifier associated with the user 505, a device identifier associated with the user device 510, and/or other information based on information required in the API call for the responding component 150a.

The API request 636 may be sent (step 3) to the corresponding responding component(s) 150. The responding component(s) 150 may include components that the action plan execution component 148 may communicate with via API requests or other type requests. As shown in FIG. 5, the responding component(s) 150 may include one or more skill/app components 554, the SSG component 556 (e.g., configured to convert input data to audio data representing synthesized speech), and the API retriever 542 (e.g., configured to provide APIs and corresponding information supported by the system 100). The responding component(s) 150 may also include an orchestrator component 730 (e.g., configured to facilitate processing by other system components 520 such as those shown in FIG. 7), a context source component (e.g., configured to provide user context data, device context data, environmental context data, dialog context data, personalized context data, etc.), a multimodal response component (e.g., configured to respond to a user input via outputs in more than one data form), a content moderation component (e.g., configured to moderate certain types of content such as biased content, harmful content, offensive content, etc.), a smart home devices component (e.g., configured to provide device information such as device state, device capabilities, etc.), a language model-based agent (e.g., a component that uses a language model (e.g., a LLM) or other type of generative model to provide information), an exemplar provider component (e.g., configured to respond to a query for relevant exemplars), a knowledge base component (e.g., including one or more knowledge bases or other structured data that can be searched to obtain information), an entity resolution component (e.g., configured to determine specific entities corresponding to entities represented in a user input or language model output), and the like.

In response to receiving the API request 636 (at step 3), the responding component(s) 150 may provide (step 4) an API response(s) 662 to the action plan execution component 148. At step 3, the API request(s) 636 is based on the action plan for prompt data 626, and thus, at step 4, the API response(s) 662 may include information relevant for processing the user input data 527. In examples, the API response(s) 662 may include relevant context information (e.g., device context, user context, environment context, dialog context, personalized context, etc.), relevant APIs and/or API descriptions for processing the user input data (e.g., API(s) for operating devices, API(s) for outputting media content, etc.), relevant exemplars, and other relevant information requested via the action plan for prompt data 626.

In example embodiments, the API request 636 may be sent to the API retriever component 542. In such cases, the API request 636 may include a query to retrieve relevant APIs based on the user input data 527. The API retriever component 542 may be configured to receive a search query and output one or more APIs or API data corresponding to (e.g., satisfying, matching, etc.) the search query. API data may include an API call, an API description, and other information associated with the API. In some embodiments, the API retriever component 542 may include or may be in communication with an index storage 544 (shown in FIG. 5). The index storage 544 may store various information associated with multiple APIs. Examples of information stored in the index storage 544 include: API/component descriptions (e.g., a description of one or more function that the API can be used to perform), API arguments (e.g., parameter inputs, input types, examples of input values, examples of output values, output type, etc.), identifiers for components corresponding to the API (e.g., alphanumerical component ID, component name, etc.), and other information. In some embodiments, the index storage 544 may include other information associated with the API, such as historical accuracy/defect rate, historical latency value, feedback (e.g., user satisfaction/feedback, system-based feedback), etc. The index storage 544 may also include sample user inputs corresponding to the API, where the sample user input may represent a user input for which the API can perform an action for.

The API retriever component 542 may apply one or more retrieval techniques to determine API data corresponding to the search query. For example, the API retriever component 542 may compare one or more APIs included/represented in the index storage 544 to the user input data 527 represented in the search query to determine one or more APIs (top-k list). Such comparison may involve a semantic comparison between the user input data 527 and the API data. In some embodiments, the API retriever component 542 may use a neural-based retrieval technique that may involve determining an encoded representation of the user input/search query and comparing (e.g., using cosine distance) the encoded representation(s) of the API data in the index storage 544. The relevant APIs may be included in the API response 662.

In a non-limiting example, for a user input "book a flight", the API retriever component 542 may determine one or more API calls corresponding to booking a flight (e.g., Bookflight.location ("departing airport code", "arrival airport code"), Bookflight.date ("departing date"), bookflight.rountrip ("departing location", "arrival location", "departure date", "return date"), AirlineBookFlight ("departing airport code", "arrival airport code"), etc.).

Some embodiments may include an exemplar provider component that may operate in a similar manner as the API retriever component 542 in terms of implementing one or more retrieval techniques to determine exemplars corresponding to (e.g., satisfying, matching, etc.) a search query based on the user input data 527. The exemplar provider component may search an index storage including various information related to multiple different exemplars. In some embodiments, the index storage may include sample user inputs associated with an exemplar, and the relevant exemplars may be retrieved based on a comparison of the sample user inputs and the user input data 527. The retrieved exemplars may be included in the API response 662.

The information from the API response(s) 662 may be included in a prompt to the language model 140. The action plan execution component 148 may determine action plan response data 638 based on the API response(s) 662. The action plan execution component 148 may combine (e.g., aggregate, summarize, de-duplicate, etc.) multiple API responses 662 to generate the action plan response data 638. In some examples, the action plan response data 638 may be the same or similar to the API response(s) 662. The action plan execution component 148 may send (step 5) the action plan response data 638 to the prompt generation component 540.

Using the action plan response data 638, the prompt generation component 540 may determine prompt 642 for the language model 140. The prompt 642 may be a natural language input (e.g., a natural language request, a natural language instruction, etc.). In some embodiments, the prompt 642 may include information in a manner that the language model 140 is trained for. The prompt generation component 540 may send (step 6) the prompt 642 to the language model 140, where the prompt 642 may include the user input data 527 (or a representation of the user input data 527) and the relevant information for processing the user input data 527. For example, the prompt 642 (at step 6) may include relevant context data, relevant APIs or API descriptions, etc. that may be included in the action plan response data 638. In some embodiments, the prompt 642 may include a request or directive for the language model 140 to respond to the user input data 527. In some embodiments, the prompt 642 may include one or more exemplars (e.g., in-context learning examples) for processing the user input data 527.

The prompt 642 may include indicators (e.g., labels, specific tokens, etc.) to identify certain information. In example embodiments, the prompt 642 may include a "User" indicator (to indicate that the following string of characters/tokens are the user input), an "Exemplar" indicator (to indicate exemplars), and so on.

In some embodiments, the prompts for the language model described herein may include a request for the language model to output a response that satisfies certain conditions. Such conditions may relate to generating a response that is unbiased (toward protected classes, such as gender, race, age, etc.), non-harmful, profanity-free, etc. For example, prompt data generated by a prompt generation component described herein may include "Please generate a polite, respectful, and safe response and one that does not violate protected class policy."

In some embodiments, the prompt 642 may include an indication the processing stages (e.g., the task generation stage, the action generation stage, and the response generation stage) that the language model 140 is to perform. In some examples, for the task generation stage, the prompt 642 may direct the language model 140 to generate an output (e.g., tokens) representing the model's interpretation of the user input and/or one or more tasks to be performed to respond to the user input (the model output may be, for example, the user is requesting [intent of the user input], the user wants to [desired user action], need to determine [information needed to properly process the user input], etc.). For the task generation stage, the prompt 642 may also direct the language model 140 to prioritize a list of tasks to be performed, if more than one task is to be performed and select one (or more) task for the current iteration of processing.

In some examples, for the action generation stage, the prompt 642 may direct the language model 140 to generate an output (e.g. tokens) representing an action(s) (or directive(s)) and/or an API call(s) corresponding to the user input, where performance of the action(s) or execution of the API(s) can be done to retrieve information to determine a response to the user's input, perform the user requested action, retrieve information/data to perform other tasks on the task list, etc. In some examples, for the action generation stage, the prompt 642 may direct the language model 140 to process the results of the action(s)/API(s) determined by the language model 140, and to determine whether a response to the user input can be generated or whether there are further tasks to be performed from the task list.

In some examples, for the response generation stage, the prompt 642 may direct the language model 140 to generate an output (e.g., tokens) representing a response (e.g., a final response) to the user input data 527. In examples, the language model 140 may be directed to generate the response based on the results of performing the action(s)/API(s).

The prompt generation component 540 may send (step 6) the prompt 642 to the language model 140, which may process the prompt 642 to generate a language model (LM) response 646. The LM response 646 may be a natural language output generated based on the prompt 642. The LM response 646 may include text tokens. In other embodiments, where the language model 140 may be a multi-modal model, the LM response 646 may include other types of tokens, for example, audio tokens, image tokens, etc.

Based on receiving the prompt 642 at step 6, the language model 140 may generate the LM response 646 at step 7, where the instant LM response 646 may include outputs corresponding to the task generation stage and the action generation stage. The LM response 646 may include an action for determining information relevant to or responsive to the user input data 527. For example, the LM response 646 may include an action to search a knowledge base (e.g., to find a response to a user question), an action to determine information from a particular skill/app or language model-based agent (e.g., to determine current weather information, to determine a cost of an item, to book travel, etc.), an action to operate a device (e.g., turn on lights, set thermostat to a particular temperature, etc.), an action to request information from the user 505, etc.

In some embodiments, the LM response 646 may include an API or API description corresponding to the determined action. For example, the LM response 646 may include an API to operate a device or an API call(s) to output media content. The language model 140 may determine the actions and/or the API information based on the relevant APIs included in the prompt 642. The language model 140 may generate actions and/or API information that is not based on (e.g., correspond to, is similar to, etc.) the relevant APIs included in the prompt 642 (for example, the language model 140 may generate incorrect/unsupported actions and/or API information).

The LM response 646 may follow the format included in the prompt 642 or that the language model 140 is trained to follow. An example prompt 642 may be:

```
{
Please process the following user input and context data to determine at least one action
or API to execute and generate a response to the user.
First determine a task to perform (use "Task" label), then determine an API to perform
the task (use "Action" label), then process the results from the API, and then generate a response
to the user input (use "Response" label). You may determine multiple tasks to perform. You
may have to process iteratively.
    User: Turn on living room TV
    Available context:
        User devices: "living room TV" = [device id]
        "living room TV" device state = Off
    Available APIs:
        TurnOn.device (device)
        Turn VolumeUp.device (device)
        SetTVChannel (device, input channel)
}
```

Based on processing the above example prompt 642, an example LM response 646 (at step 7) may be:

```
{
Task: User wants to turn on living room TV that is operation of a user device.
Action: I need an API to operate a device. TurnOn.device (device = "living room TV")
}
```

The LM response 646 may be sent (step 7) to the action plan generation component 145, which may determine action plan data 652. As described herein, the language model 140 may generate tokens in sequence, as such, the language model 140 may generate portions of the LM response 646 in a tokens-by-tokens basis. In some embodiments, the LM response 646 may be processed by the action plan generation component 145 based on the language model 140 generating the tokens representing the action or corresponding to the action generation stage.

The action plan generation component 145 may process the LM response 646 to identify one or more actions/APIs generated by the language model 140. In examples, the action plan generation component 145 may parse the tokens/text included in the LM response 646 to extract tokens/text representing an action or API. In some embodiments, the action plan generation component 145 may be configured to determine one or more components (e.g., responding components 150*a-n*) configured to perform the identified action or API. Based on the LM response 646, the action plan generation component 145 may determine the action plan data 652, which may in turn cause performance of an action (e.g., execution of API calls) to determine a potential responses(s) to the user input. The action plan data 652 may include one or more APIs to be executed, where the APIs may be determined based on (e.g., extracted from) the LM response 646. For example, if the LM response 646 includes an action of "determine weather forecast for today" or an API call of "GetWeather.location ([city])", then the action plan generation component 145 may determine the action plan data 652 to include an API call "GetWeather.location ([city])" and include an identifier for the responding component(s) 150*a* (e.g., a weather skill component). Instead of or in addition to an API call, the action plan data 652 may include a request to perform an action, an API description, etc. In some embodiments, the action plan generation component 145 may determine the responding components 150 based on user permissions, subscriptions, authorization or other use-enabling information associated with the user 505 (e.g., included in user profile data).

In some embodiments, the action plan generation component 145 may be configured to determine more than one responding component 150 to perform the action/execute the API indicated in the LM response 646. In some embodiments, the action plan generation component 145 may determine APIs corresponding to multiple responding components 150. For example, for the "GetWeather.location ([city])" API, the action plan data 652 may include an identifier for a first weather skill component, an identifier for a second weather skill component, an identifier for a search engine component, etc.

The action plan data 652 may be sent (step 8) to the action plan execution component 148. The action plan execution component 148 may identify the APIs in the action plan data 652 and generate executable API calls for the corresponding responding components 150. Based on the action plan data (received at step 8), the action plan execution component 148 may generate an additional (a second) API request (or multiple API requests) 636. The (additional/second) API request(s) 636 may be sent (step 9) to the responding component(s) 150. For example, the action plan execution component 148 may send a first API call to a first responding component 150*a* and a second API call to a second responding component 150*b*.

In some cases, the action plan data 652 may include incomplete API calls and the action plan execution component 148 may be configured to generate executable API calls (e.g., complete API calls) corresponding to the action plan data 652.

The action plan execution component 148 may generate one or more executable API calls including one or more parameters using information included in the action plan data 652 and/or various other contextual information (e.g., speaker recognition results, a user ID, user profile information (e.g., age, gender, location, language, geographic marketplace, etc.), device ID, device profile information, device state indicators, a dialog history, and/or an interaction history associated with the user and/or the device, etc.). In some embodiments, the various contextual information may be contextual information not provided to the language model orchestrator component 130. Prior to generating the executable commands, the action plan execution component 148 may modify (e.g., remove, filter, preempt, etc.) a directive included in the action plan data 652 that is determined to be in conflict with a system operating policy. The action plan execution component 148 may generate one or more additional executable commands corresponding to directives not included in the action plan data 652.

In response to receiving the API request(s) 636 (at step 9), the responding component(s) 150 may send (step 10) an (additional/second) API response(s) 662 to the action plan execution component 148. The action plan execution component 148 may determine (additional/second) action plan response data 638 based on the (additional/second) API response(s) 662. The action plan execution component 148 may combine (e.g., aggregate, summarize, de-duplicate, etc.) multiple API responses 662 to generate the action plan response data 638. In some examples, the action plan response data 638 may be the same or similar to the API response(s) 662. In some examples, the action plan response data 638 may include an identifier associated with the responding component 150 that provided the API response 662. For example, the (additional/second) action plan response data 638 may include first weather information from a first weather skill component, second weather information from a second weather skill component, third weather information from a search engine component, etc. In some embodiments, the action plan execution component 148 may remove/filter information from the API response 662 that is determined to include information not beneficial to the processing by the language model 140.

The action plan execution component 148 may send (step 11) the (additional/second) action plan response data 638 to the prompt generation component 540. The information from the API response(s) 662 may be included, by the prompt generation component 540, in a (additional/second) prompt to the language model 140. The prompt generation component 540 may generate the second prompt 642 to include the action plan response data 638 or a representation thereof. The second prompt 642 may also include information from the prior/first prompt (from step 6). For example, the second prompt 642 may include the user input data 527 (or a representation thereof), the relevant information for processing the user input data 527 (e.g., relevant context data, relevant API information, relevant exemplars, etc.), the processing stages information, and the action plan response data 638 (from step 11). In some embodiments, the second prompt 642 may also include at least a portion of the LM response 646 generated during a prior iteration of processing (e.g., the outputs based on performing the task generation stage and the action generation stage) to indicate actions/results of the prior iteration of processing by the language model 140. The second prompt 642 may include an indicator (e.g., label, identifier, etc.) associated with the action plan response data 638 to indicate, to the language model 140, that the string of characters/tokens following the indicator represent information determined based on performance of the actions determined during the action generation stage.

The second prompt 642 may be sent (step 12) to the language model 140 for processing. At this point, the language model 140 may perform the action generation stage of processing the results of the performed actions, which may involve interpreting or understanding the results included in the action plan response data 638. The language model 140 may generate (step 13) a (additional/second) LM response 646 based on the second prompt 642. The second prompt 642 may include a request or directive to the language model 140 to perform further processing with respect to the user input data 527. As described above, the second prompt 642 may provide, among other things, responses/results of performance of the action determined by the language model 140 determined during the prior iteration of processing. The language model 140 may generate further actions to be performed to respond to the user input data 527 (as part of the action generation stage) or may generate a (final/user-facing) response to the user input data 527 (as part of the response generation stage).

An example second prompt 642 may be:

---

{
    Please process the following user input and context data to determine at least one action or API to execute and generate a response to the user.
       First determine a task to perform (use "Task" label), then determine an API to perform the task (use "Action" label), then process the results from the API, and then generate a response to the user input (use "Response" label). You may determine multiple tasks to perform. You may have to process iteratively.
    User: Turn on living room TV
    Available context:
       User devices: "living room TV" = [device id]
       "living room TV" device state = Off
    Available APIs:
       TurnOn.device (device)
       Turn VolumeUp.device (device)

```
    SetTVChannel (device, input channel)
    Prior Iteration:
        Action: TurnOn.device (device = "living room TV")
    TurnOn.device (device = "living room TV"); API response: "living room TV" device
state = ON
}
```

Based on the above example prompt 642, an example LM response 646 may be:

```
{
Task: User wants to turn on living room TV that is operation of a user device.
Action: I need an API to operate a device. TurnOn.device (device = "living room TV")
Action result is "living room TV" device state = ON
Response: The living room TV is on now. Can I help you with anything else?
}
```

As described herein, the language model 140 may generate the LM response 646 on tokens-by-tokens basis. As such, in some examples, the second LM response 646 may include additional tokens (e.g., newly generated tokens) to the first LM response 646 (from step 7). In other examples, the second LM response 646 may include different tokens than the first LM response 646, where the currently generated tokens may represent outputs for further steps of the action generation stage and/or the response generation stage.

The language model 140 may determine further actions/APIs to be performed in a similar manner as described above. Such further actions/APIs may be based on any tasks, included in the task list generated during the task generation stage, that are still to be performed (e.g., a first task of booking a flight may be done, now a second task of booking a hotel is to be performed). Additionally or alternatively, the further actions/APIs may be based on the results included in the action plan response data 638 (at step 11) (e.g., an API response from a responding component 150 may indicate that additional information is needed to perform an action).

The language model 140 may determine a (final) response to the user input, where the response is to be presented to the user 505 via the user device 510. In other cases, the response may be presented via another user device 510 associated with the user 505. The language model 140 may determine the final response based on the results included in the action plan response data 638 (from step 11). For example, the language model 140 may summarize the results, may combine the results, may generate an interpretation of the results, etc. In a non-limiting example, the language model 140 may combine weather information from two or more responding components (e.g., combine high/low temperature information from a first responding component with humidity information from a second responding component). In another non-limiting example, the language model 140 may interpret results from a knowledge base component to determine a response to the specific user query (e.g., from a biographical search result for a historical person, a birthplace and siblings information may be extracted to determine a response to a user query "tell me about [person's] childhood").

In some examples, the language model 140 may generate the further action to be performed is requesting additional information from the user 505. Such further action, in some embodiments, may be labeled as "Response" so that the action plan generation component 145 may cause a request to be output to the user 505.

The second LM response 646 may be sent (step 13) to the action plan generation component 145, which may determine (step 14) the (additional/second) action plan data 652. In some examples, the second LM response 646 sent to the action plan generation component 145 may include further action(s)/API(s) to be executed, which may be labeled with "Action." In some examples, the second LM response 646 may include a final response to the user input, which may be labeled with "Response."

Based on the tokens corresponding to the "Action" label, the action plan generation component 145 may determine the action plan data 652 to include one or more actions, one or more API calls and/or one or more responding components 150 corresponding to the action(s)/API(s) determined by the language model 140.

Based on the tokens corresponding to the "Response" label, the action plan generation component 145 may determine the action plan data 652 to include one or more actions, one or more API calls and/or one or more responding components 150 to present the output tokens to the user 505 as a response to the user input. For example, the action plan data 652 may include an identifier for the SSG component 556 to cause the output tokens, generated by the language model 140, to be presented as synthesized speech. As another example, the action plan data 652 may include an identifier for the responding component 150 capable of generating outputs in more than one form (e.g., a multi-modal output component) to cause the tokens to be presented as synthesized speech, displayed text/graphics, and/or other types of outputs.

The (second) action plan data 652 may be sent (step 14) to the action plan execution component 148, and as described herein, the action plan execution component 148 may determine executable API calls based on the action plan data 652. If the action plan data 652 represents additional actions to be performed, then the action plan execution component 148 may cause the corresponding responding component(s) 150 to perform the additional action(s) and corresponding response(s) (e.g., API responses 662) may be communicated to the prompt generation component 540 (via the action plan execution component 148 and action plan response data 638) to initiate another iteration of processing by the language model 140 with respect to the user input data 527. If the action plan data 652 represents a response to be presented to the user 505, then the action plan execution component 148 may cause the corresponding responding component(s) 150 to determine output data (e.g., responsive output data 562 shown in FIG. 5) that may be presented via the user device 510. For example, the responsive output data 562 may be sent to the user device 510 via the orchestrator component 730 or another system component(s) 520 (described in relation to FIG. 7).

In some embodiments, when further actions are generated by the language model 140 to be performed with respect to the user input data 527, the language model orchestrator component 130 may perform another iteration of processing, which may involve generating another prompt 642 to the language model 140, generating another LM response 646 that may be used to determine further action plan data 652. The language model 140 may generate tokens corresponding to the action generation stage and/or the response generation stage during the further iteration.

In some embodiments, when a final response is generated by the language model 140, further processing with respect to the user input data 527 by the language model orchestrator component 130 may be ceased (e.g., processing with respect to the user input data 527 by the language model orchestrator component 130 may be complete). The language model orchestrator component 130 may process with respect to a subsequently received user input, which may or may not be part of the same dialog session as the prior/already processed user input data 527.

The responsive output data 562 may include one or more of output audio data representing synthesized speech, text data for display, image for display, graphics/icons for display, media (e.g., video, music, background music, notification sounds, etc.) for playback, and other data. In some embodiments, the responsive output data 562 may include placement information representing where (e.g., top banner, left portion, center of screen, overlay on current visual, etc.) on the display screen of the user device 510 the output data is to be displayed. In some embodiments, the responsive output data 562 may be determined/provided by the responding component 150. In some embodiments, another system component 520 may process the responsive output data 562 prior to sending to the user device 510 to ensure that the responsive output data is formatted for the particular user device 510.

Referring again to FIG. 5, as shown, the system component(s) 520 may include a compliance component 570. In some embodiments, the compliance component 570 may be included in the language model orchestrator component 130. In other embodiments, the compliance component 570 may be one of the responding components 150 and the action plan generation component 145 may cause the action plan execution component 148 to send an API request to the compliance component 570 when processing by the compliance component 570 is to be performed.

The compliance component 570 may be configured to determine whether an output of the language model 140 is appropriate for output to the user 505. In some embodiments, the compliance component 570 may be configured to process language model output (e.g., the LM response 646) representing outputs/tokens generated by the language model 140 during processing of the user input data 527. The model output may include tokens generated during the task generation stage, the action generation stage or the response generation stage. The compliance component 570 may also or instead determine whether an input to the language model 140 (e.g., a user request, an output of another system component of the system 100) is appropriate and/or that the input will result in the language model 140 generating an output that is appropriate to present to the user 505. For this determination, the compliance component 570 may process the user input data 527 or a portion or representation thereof. In some embodiments, the compliance component 570 may process other data (e.g., context data, user profile data, system configuration/policy data, etc.) to determine whether the generated response and/or the input is appropriate.

In some embodiments, the compliance component 570 may determine whether the model output/LM response 646 and/or the user input data 527 corresponds to training data used to configure the language model 140 (e.g., the model output or user input is semantically or lexically similar to the training data, the model output or user input corresponds to functionality (e.g., topics, categories, actions, etc.) that the model is trained for, etc.). Additionally or alternatively, the compliance component 570 may determine whether the model output/LM response 646 and/or the user input data 527 corresponds to one or more words or phrases determined to be confidential, sensitive, or offensive. Additionally or alternatively, the compliance component 570 may determine whether the user input or the model output corresponds to an inappropriate content category, which may include biased content (e.g., biased toward protected classes including gender, race, age, etc.), harmful content (e.g., violent content, self-harm, etc.), profanity, etc.

In some embodiments, the compliance component 570 may use one or more techniques to determine whether the model output or the user input is appropriate; such techniques may include a rules-engine, a word-based similarity determination, a machine learning model based determination (e.g., using a classifier to classify model output or user input to appropriate category or inappropriate category), etc.

In some embodiments, the compliance component 570 may process the user input data 527 when it is received by the language model orchestrator component 130 and in some cases may process in parallel to the language model orchestrator component 130. In some embodiments, the compliance component 570 may process the model output as the language model 140 generates the output tokens. In other embodiments, the compliance component 570 may process the model output after the language model 140 has generated tokens for a particular processing stage (e.g., after the task generation stage is completed, after the action generation stage is completed, after the response generation stage is completed, etc.).

If the compliance component 570 determines that the model output or the user input data 527 is appropriate, then the language model orchestrator component 130 may continue processing with respect to the user input data 527. If the compliance component 570 determines that the model output is not appropriate, then one or more remedial actions may be performed. One example remedial action may involve prompting the language model 140 to generate a new/modified model output. In such examples, additional prompt data may be determined, which may include the original prompt data, the initial model output, and an indication that the initial model output is not appropriate for output to the user 505. The additional prompt data may include a request or directive to the language model 140 to generate model output that is appropriate for output to the user 505. Another example remedial action may involve the system outputting a generic/template response (e.g., "Sorry, I can't help you with that" or "I cannot answer questions for [inappropriate category])") or a request for a rephrased input (e.g., "can you rephrase that").

In some embodiments, the compliance component 570 may cause the system to output a response indicating where (e.g., a source external to the system components 520) the included/outputted information may be found. For example, the response may include an indication of a source of the training data or the data (e.g., API response 662) that the response is based on (e.g., the indication may include a description of an owner of the intellectual property rights corresponding to the training data/the response information, a hyperlink to the source, etc.). In some embodiments the compliance component 570 may determine that the model generated response is based on (e.g., summarizing, using, similar to, etc.) data that protected by intellectual property rights (or other laws), and instead of outputting the language model generated response (e.g., LM response 646). In some embodiments the responsive output data 562 may include an indication of the intellectual property rights owner, may include access to a source of the data (e.g., website link), or may include a template response (e.g., "I cannot process this request" or "The requested data is protected by intellectual property rights", etc.). In some embodiments, the compliance component 570 may determine that the user input data 527 involves processing data or outputting data that is protected by certain intellectual property rights (or other laws). An example of such a user input may be "write a story about [protected character]" or "draw an image of [protected character] doing [some action]", where the owner of intellectual property rights in the [protected character] may not allow use, copying, or other operations. In response, the system may cease or prevent processing by the language model orchestrator component 130 of the user input data 527, and the system may output a template response (e.g., "I cannot process this request" or "The requested data is protected by intellectual property rights", etc.).

As shown in FIG. 5, the system component(s) 520 may include a personalized context component 565. In some embodiments, the personalized context component 565 may be included in the language model orchestrator component 130. In other embodiments, the personalized context component 565 may be one of the responding components 150 and the action plan generation component 145 may cause the action plan execution component 148 to send an API request to the personalized context component 565.

The personalized context component 565 may be configured to determine personalized context data including context data corresponding to the user input data 527 and/or the user 505. In some embodiments, the initial plan generation component 535 may request personalized context data to include in the prompt 642. In other embodiments, other system component(s) 520, such as the language model 140, may request personalized context data (e.g., to determine a personalized response to a user input). The personalized context data may include user preferences, past user inputs, past system outputs for past user inputs from the user 505, past skill/app usage, user-defined items, etc. The personalized context component 565 may infer user preferences from user-provided preferences, past user interactions by the user 505, information related to users similar to the user 505, etc. In some embodiments, the personalized context component 565 may employ one or more techniques to determine the personalized context data; such techniques may include using a rules-engine, using one or more machine learning models (including a generative model), topic determination techniques, neural retrieval search techniques, etc.

In examples, the personalized context component 565 may receive the user input data 527, task data representing a current task being performed/processed, and/or model output indicating that an ambiguity exists or additional information is needed to generate a response to the user input. The personalized context component 565 may receive a query in some examples, which may include an identifier for the user 505. In a non-limiting example, the personalized context component 565 may receive the following example requests: "Does the user prefer to use [Music Service 1] or [Music Service 2] for playing music," or "What kind of music does the user like?" The personalized context component 565 determine example personalized context data including "The user prefers [Music Service 1]" or "The user likes [music genre]").

Further information related to the SSG component 556 and the skill/app component 554 is described herein in relation to FIG. 7.

In some embodiments, the language model 140 may be fine-tuned to perform a particular task(s). Fine-tuning of the language model(s) may be performed using one or more techniques. One example fine-tuning technique is transfer learning that involves reusing a pre-trained model's weights and architecture for a new task. The pre-trained model may be trained on a large, general dataset, and the transfer learning approach allows for efficient and effective adaptation to specific tasks. Another example fine-tuning technique is sequential fine-tuning where a pre-trained model is fine-tuned on multiple related tasks sequentially. This allows the model to learn more nuanced and complex language patterns across different tasks, leading to better generalization and performance. Yet another fine-tuning technique is task-specific fine-tuning where the pre-trained model is fine-tuned on a specific task using a task-specific dataset. Yet another fine-tuning technique is multi-task learning where the pre-trained model is fine-tuned on multiple tasks simultaneously. This approach enables the model to learn and leverage the shared representations across different tasks, leading to better generalization and performance. Yet another fine-tuning technique is adapter training that involves training lightweight modules that are plugged into the pre-trained model, allowing for fine-tuning on a specific task without affecting the original model's performance on other tasks. Some techniques may involve supervised fine-tuning (SFT), unsupervised fine-tuning, semi-supervised fine-tuning, or other types of learning.

In some embodiments, one or more of the system components 520 described herein may be configured to begin processing with respect to data as soon as the data or a portion of the data is available to the components (e.g., processing in a streaming fashion). Some system components may be generative components/models that can begin processing with respect to portions of data as they are available, instead of waiting to initiate processing after the entirety of data is available. For example, the language model 140 may start processing a first portion of the prompt 642 while the prompt generation component 540 determines a second/subsequent portion of the prompt 642. As another example, the action plan generation component 145 may start processing a first portion of the LM response 646 while the language model 140 is generating a second/subsequent portion of the LM response 646.

The system 100 may operate using various components as described in FIG. 7. The various components may be located on same or different physical devices. Communication between various components may occur directly or across a network(s) 199. The user device 510 may include audio capture component(s), such as a microphone or array of microphones of a user device 510, captures audio 710 and creates corresponding audio data. Once speech is detected in audio data representing the audio 710, the user device 510 may determine if the speech is directed at the user device 510/system component(s). In at least some embodiments, such determination may be made using a wakeword detection component 720. The wakeword detection component 720 may be configured to detect various wakewords. In at least some examples, each wakeword may correspond to a name of a different digital assistant. An example wakeword/digital assistant name is "Alexa." In another example, input to the system may be in form of text data 713, for example as a result of a user typing an input into a user interface of user device 510. Other input forms may include indication that the user has pressed a physical or virtual button on user device 510, the user has made a gesture, etc. The user device 510 may also capture images using camera(s) of the user device 510 and may send image data 721 representing those image(s) to the system component(s). The image data 721 may include raw image data or image data processed by the user device 510 before sending to the system component(s). The image data 721 may be used in various manners by different components of the system to perform operations such as determining whether a user is directing an utterance to the system, interpreting a user command, responding to a user command, etc. In some embodiments, the user input data 527 (described in relation to FIG. 5) may include one or more the audio 710, the audio data 711, the text data 713 and the image data 721.

The wakeword detection component 720 of the user device 510 may process the audio data, representing the audio 710, to determine whether speech is represented therein. The user device 510 may use various techniques to determine whether the audio data includes speech. In some examples, the user device 510 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the user device 510 may implement a classifier configured to distinguish speech from background noise. The classifier may be implemented by techniques such as linear classifiers, support vector machines, and decision trees. In still other examples, the user device 510 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 710, is analyzed to determine if specific characteristics of the audio data match preconfigured acoustic waveforms, audio signatures, or other data corresponding to a wakeword.

Thus, the wakeword detection component 720 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN HMM decoding framework. In another example, the wakeword detection component 720 may be built on deep neural network (DNN)/recursive neural network (RNN) structures directly, without HMM being involved. Such an architecture may estimate the posteriors of wakewords with context data, either by stacking frames within a context window for DNN, or using an RNN. Follow-on posterior threshold tuning or smoothing is applied for decision making. Other techniques for wakeword detection, such as those known in the art, may also be used.

Once the wakeword is detected by the wakeword detection component 720 and/or input is detected by an input detector, the user device 510 may "wake" and begin transmitting audio data 711, representing the audio 710, to the system component(s) 520. The audio data 711 may include data corresponding to the wakeword; in other embodiments, the portion of the audio corresponding to the wakeword is removed by the user device 510 prior to sending the audio data 711 to the system component(s) 520. In the case of touch input detection or gesture-based input detection, the audio data may not include a wakeword.

In some implementations, the system 100 may include more than one system component(s). The system component(s) 520 may respond to different wakewords and/or perform different categories of tasks. Each system component(s) may be associated with its own wakeword such that speaking a certain wakeword results in audio data be sent to and processed by a particular system. For example, detection of the wakeword "Alexa" by the wakeword detection component 720 may result in sending audio data to system component(s) 520*a* for processing while detection of the wakeword "Computer" by the wakeword detector may result in sending audio data to system component(s) 520*b* for processing. The system may have a separate wakeword and system for different skills/systems (e.g., "Castle Adventure" for a game play skill/system component(s) 520*c*) and/or such skills/systems may be coordinated by one or more skill component(s) 554 of one or more system component(s) 520.

The user device 510/system component(s) 520 may also include a system directed input detector 785. The system directed input detector 785 may be configured to determine whether an input to the system (for example speech, a gesture, etc.) is directed to the system or not directed to the system (for example directed to another user, etc.). The system directed input detector 785 may work in conjunction with the wakeword detection component 720. If the system directed input detector 785 determines an input is directed to the system, the user device 510 may "wake" and begin sending captured data for further processing. If data is being processed the user device 510 may indicate such to the user, for example by activating or changing the color of an illuminated output (such as a light emitting diode (LED) ring), displaying an indicator on a display (such as a light bar across the display), outputting an audio indicator (such as a beep) or otherwise informing a user that input data is being processed. If the system directed input detector 785 determines an input is not directed to the system (such as a speech or gesture directed to another user) the user device 510 may discard the data and take no further action for processing purposes. In this way the system 100 may prevent processing of data not directed to the system, thus protecting user privacy. As an indicator to the user, however, the system may output an audio, visual, or other indicator when the system directed input detector 785 is determining whether an input is potentially device directed. For example, the system may output an orange indicator while considering an input and may output a green indicator if a system directed input is detected. Other such configurations are possible.

Upon receipt by the system component(s) 520, the audio data 711 may be sent to an orchestrator component 730 and/or the language model orchestrator component 130. The orchestrator component 730 may include memory and logic that enables the orchestrator component 730 to transmit various pieces and forms of data to various components of the system, as well as perform other operations as described herein. In some embodiments, the orchestrator component 730 may optionally be included in the system component(s) 520. In embodiments where the orchestrator component 730 is not included in the system component(s) 520, the audio data 711 may be sent directly to the language model orchestrator component 130. Further, in such embodiments, each of the components of the system component(s) 520 may be configured to interact with the language model orchestrator component 130, the action plan execution component 148, the API provider component, and/or other component(s).

In some embodiments, the system component(s) 520 may include an arbitrator component 782, which may be configured to determine whether the orchestrator component 730 and/or the language model orchestrator component 130 are to process with respect to user input data. In some embodiments, the language model orchestrator component 130 may be selected to process with respect to the audio data 711 only if the user 505 associated with the audio data 711 (or the user device 510 that captured the audio 710) has previously indicated that the language model orchestrator component 130 may be selected to process with respect to user inputs received from the user 505.

In some embodiments, the arbitrator component 782 may determine the orchestrator component 730 and/or the language model orchestrator component 130 are to process with respect to the audio data 711 based on metadata associated with the audio data 711. For example, the arbitrator component 782 may be a classifier configured to process a natural language representation of the audio data 711 (e.g., output by the ASR component 750) and classify the corresponding user input as to be processed by the orchestrator component 730 and/or the language model orchestrator component 130. For further example, the arbitrator component 782 may determine whether the device from which the audio data 711 is received is associated with an indicator representing the audio data 711 is to be processed by the orchestrator component 730 and/or the language model orchestrator component 130. As an even further example, the arbitrator component 782 may determine whether the user (e.g., determined using data output from the user recognition component 795) from which the audio data 711 is received is associated with a user profile including an indicator representing the audio data 711 is to be processed by the orchestrator component 730 and/or the language model orchestrator component 130. As another example, the arbitrator component 782 may determine whether the audio data 711 (or the output of the ASR component 750) corresponds to a request representing that the audio data 711 is to be processed by the orchestrator component 730 and/or the language model orchestrator component 130 (e.g., a request including "let's chat" may represent that the audio data 711 is to be processed by the language model orchestrator component 130).

In some embodiments, if the arbitrator component 782 is unsure (e.g., a confidence score corresponding to whether the orchestrator component 730 and/or the language model orchestrator component 130 is to process is below a threshold), then the arbitrator component 782 may send the audio data 711 to both of the orchestrator component 730 and the language model orchestrator component 130. In such embodiments, the orchestrator component 730 and/or the language model orchestrator component 130 may include further logic for determining further confidence scores during processing representing whether the orchestrator component 730 and/or the language model orchestrator component 130 should continue processing, as is discussed further herein below.

The arbitrator component 782 may send the audio data 711 to an ASR component 750. In some embodiments, the component selected to process the audio data 711 (e.g., the orchestrator component 730 and/or the language model orchestrator component 130) may send the audio data 711 to the ASR component 750. The ASR component 750 may transcribe the audio data 711 into text data. The text data output by the ASR component 750 represents one or more than one (e.g., in the form of an N-best list) ASR hypotheses representing speech represented in the audio data 711. The ASR component 750 interprets the speech in the audio data 711 based on a similarity between the audio data 711 and pre-established language models. For example, the ASR component 750 may compare the audio data 711 with models for sounds (e.g., acoustic units such as phonemes, senons, phones, etc.) and sequences of sounds to identify words that match the sequence of sounds of the speech represented in the audio data 711. The ASR component 750 sends the text data generated thereby to the arbitrator component 782, the orchestrator component 730, and/or the language model orchestrator component 130. In instances where the text data is sent to the arbitrator component 782, the arbitrator component 782 may send the text data to the component selected to process the audio data 711 (e.g., the orchestrator component 730 and/or the language model orchestrator component 130). The text data sent from the ASR component 750 to the arbitrator component 782, the orchestrator component 730, and/or the language model orchestrator component 130 may include a single top-scoring ASR hypothesis or may include an N-best list including multiple top-scoring ASR hypotheses. An N-best list may additionally include a respective score associated with each ASR hypothesis represented therein.

In some embodiments, the orchestrator component 730 may cause a NLU component (not shown) to perform processing with respect to the ASR data generated by the ASR component 750. The NLU component may attempt to make a semantic interpretation of the phrase(s) or statement(s) represented in the ASR data input therein by determining one or more meanings associated with the phrase(s) or statement(s) represented in the text data. The NLU component may determine an intent representing an action that a user desires be performed and may determine information that allows a device (e.g., the device 510, the system component(s) 520, a skill/app component 554, a skill system component(s) 725, etc.) to execute the intent. For example, if the ASR data corresponds to "play the 5th Symphony by Beethoven," the NLU component may determine an intent that the system output music and may identify "Beethoven" as an artist/composer and "5th Symphony" as the piece of music to be played. For further example, if the ASR data corresponds to "what is the weather," the NLU component may determine an intent that the system output weather information associated with a geographic location of the device 510. In another example, if the ASR data corresponds to "turn off the lights," the NLU component may determine an intent that the system turn off lights associated with the device 510 or the user 505. However, if the NLU component is unable to resolve the entity—for example, because the entity is referred to by anaphora such as "this song" or "my next appointment"—the system can send a decode request to another speech processing system for information regarding the entity mention and/or other context related to the utterance. The natural language processing system may augment, correct, or base results data upon the ASR data as well as any data received from the system.

The NLU component may return NLU results data (which may include tagged text data, indicators of intent, etc.) back to the orchestrator component 730. The orchestrator component 730 may forward the NLU results data to a skill component(s) 554. If the NLU results data includes a single NLU hypothesis, the NLU component and the orchestrator component 730 may direct the NLU results data to the skill component(s) 554 associated with the NLU hypothesis. If the NLU results data includes an N-best list of NLU hypotheses, the NLU component and the orchestrator component 730 may direct the top scoring NLU hypothesis to a skill component(s) 554 associated with the top scoring NLU hypothesis. The system may also include a post-NLU ranker which may incorporate other information to rank potential interpretations determined by the NLU component.

In some embodiments, after determining that the orchestrator component 730 and/or the language model orchestrator component 130 should process with respect to the user input, the arbitrator 782 may be configured to periodically determine whether the orchestrator component 730 and/or the language model orchestrator component 130 should continue processing with respect to the user input. For example, after a particular point in the processing of the orchestrator component 730 (e.g., after performing NLU, prior to determining a skill component 554 to process with respect to the user input, prior to performing an action responsive to the user input, etc.) and/or the language model orchestrator component 130 (e.g., after selecting a task to be completed, after receiving the action response data from the one or more components, after completing a task, prior to performing an action responsive to the user input, etc.) the orchestrator component 730 and/or the language model orchestrator component 130 may query the arbitrator component 782 has determined that the orchestrator component 730 and/or the language model orchestrator component 130 should halt processing with respect to the user input. As discussed above, the system 100 may be configured to stream portions of data associated with processing with respect to a user input to the one or more components such that the one or more components may begin performing their configured processing with respect to that data as soon as it is available to the one or more components. As such, the arbitrator component 782 may cause the orchestrator component 730 and/or the language model orchestrator component 130 to begin processing with respect to a user input as soon as a portion of data associated with the user input is available (e.g., the ASR data, context data, output of the user recognition component 795. Thereafter, once the arbitrator component 782 has enough data to perform the processing described herein above to determine whether the orchestrator component 730 and/or the language model orchestrator component 130 is to process with respect to the user input, the arbitrator component 782 may inform the corresponding component (e.g., the orchestrator component 730 and/or the language model orchestrator component 130) to continue/halt processing with respect to the user input at one of the logical checkpoints in the processing of the orchestrator component 730 and/or the language model orchestrator component 130.

A skill system component(s) 725 may communicate with a skill/app component(s) 554 within the system component(s) 520 directly with the orchestrator component 730 and/or the action plan execution component 148, or with other components. A skill system component(s) 725 may be configured to perform one or more actions. An ability to perform such action(s) may sometimes be referred to as a "skill." That is, a skill may enable a skill system component(s) 725 to execute specific functionality in order to provide data or perform some other action requested by a user. For example, a weather service skill may enable a skill system component(s) 725 to provide weather information to the system component(s) 520, a car service skill may enable a skill system component(s) 725 to book a trip with respect to a taxi or ride sharing service, an order pizza skill may enable a skill system component(s) 725 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system component(s) 520 may be configured with a skill/app component 554 dedicated to interacting with the skill system component(s) 725. Unless expressly stated otherwise, reference to a skill, skill device, or skill component may include a skill/app component 554 operated by the system component(s) 520 and/or skill/app operated by the skill system component(s) 725. Moreover, the functionality described herein as a skill or skill may be referred to using many different terms, such as an action, bot, app, or the like. The skill component 554 and or skill system component(s) 725 may return output data to the orchestrator component 730.

The system component(s) includes a SSG component 756. The SSG component 756 may generate audio data (e.g., synthesized speech) from text data, text embeddings, text tokens, audio tokens, audio embeddings, etc., using one or more different methods. Data input to the SSG component 756 may come from a skill/app component 554, the orchestrator component 730, the action plan execution component 148, or another component of the system. In one method of synthesis called unit selection, the SSG component 756 matches data against a database of recorded speech. The SSG component 756 selects matching units of recorded speech and concatenates the units together to form audio data. In another method of synthesis called parametric synthesis, the SSG component 756 varies parameters such as frequency, volume, and noise to create audio data including an artificial speech waveform. Parametric synthesis uses a computerized voice generator, sometimes called a vocoder.

The user device 510 may include still image and/or video capture components such as a camera or cameras to capture one or more images. The user device 510 may include circuitry for digitizing the images and/or video for transmission to the system component(s) 520 as image data. The user device 510 may further include circuitry for voice command-based control of the camera, allowing a user 505 to request capture of image or video data. The user device 510 may process the commands locally or send audio data 711 representing the commands to the system component(s)

520 for processing, after which the system component(s) 520 may return output data that can cause the user device 510 to engage its camera.

The system component(s) 520/the user device 510 may include a user recognition component 795 that recognizes one or more users using a variety of data. However, the disclosure is not limited thereto, and the user device 510 may include the user recognition component 795 instead of and/or in addition to the system component(s) 520 without departing from the disclosure.

The user recognition component 795 may take as input the audio data 711 and/or text data output by the ASR component 750. The user recognition component 795 may perform user recognition by comparing audio characteristics in the audio data 711 to stored audio characteristics of users. The user recognition component 795 may also perform user recognition by comparing biometric data (e.g., fingerprint data, iris data, etc.), received by the system in correlation with the present user input, to stored biometric data of users assuming user permission and previous authorization. The user recognition component 795 may further perform user recognition by comparing image data (e.g., including a representation of at least a feature of a user), received by the system in correlation with the present user input, with stored image data including representations of features of different users. The user recognition component 795 may perform additional user recognition processes, including those known in the art.

The user recognition component 795 determines scores indicating whether user input originated from a particular user. For example, a first score may indicate a likelihood that the user input originated from a first user, a second score may indicate a likelihood that the user input originated from a second user, etc. The user recognition component 795 also determines an overall confidence regarding the accuracy of user recognition operations.

Output of the user recognition component 795 may include a single user identifier corresponding to the most likely user that originated the user input. Alternatively, output of the user recognition component 795 may include an N-best list of user identifiers with respective scores indicating likelihoods of respective users originating the user input. The output of the user recognition component 795 may be used to inform processing of the arbitrator component 782, the orchestrator component 730, and/or the language model orchestrator component 130 as well as processing performed by other components of the system.

The system component(s) 520/user device 510 may include a presence detection component that determines the presence and/or location of one or more users using a variety of data.

The system 100 (either on user device 510, system component(s), or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 770 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more internet protocol (IP) addresses, medium access control (MAC) addresses, and/or device identifiers, such as a serial number, of each additional electronic device associated with the identified user account. When a user logs into to an application installed on a user device 510, the user profile (associated with the presented login information) may be updated to include information about the user device 510, for example with an indication that the device is currently in use. Each user profile may include identifiers of components (e.g., responding component(s) 150 such as skills/apps, language model-based agents, knowledge bases, components for a particular domain, etc.) that the user has enabled. When a user enables a component, the user is providing the system component(s) with permission to allow the component to execute with respect to the user's inputs. If a user does not enable a component, the system component(s) may not invoke that component to execute with respect to the user's inputs.

The profile storage 770 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 770 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

Although the components of FIG. 7 may be illustrated as part of system component(s) 520, user device 510, or otherwise, the components may be arranged in other device(s) (such as in user device 510 if illustrated in system component(s) 520 or vice-versa, or in other device(s) altogether) without departing from the disclosure.

In at least some embodiments, the system component(s) 520 may receive the audio data 711 from the user device 510, to recognize speech corresponding to a spoken input in the received audio data 711, and to perform functions in response to the recognized speech. In at least some embodiments, these functions involve sending directives (e.g., commands), from the system component(s) to the user device 510 (and/or other user devices 510) to cause the user device 510 to perform an action, such as output an audible response to the spoken input via a loudspeaker(s), and/or control secondary devices in the environment by sending a control command to the secondary devices.

Thus, when the user device 510 is able to communicate with the system component(s) over the network(s) 199, some or all of the functions capable of being performed by the system component(s) may be performed by sending one or more directives over the network(s) 199 to the user device 510, which, in turn, may process the directive(s) and perform one or more corresponding actions. For example, the system component(s), using a remote directive that is included in response data (e.g., a remote response), may direct the user device 510 to output an audible response (e.g., using SSG processing performed by an on-device SSG component) to a user's question via a loudspeaker(s) of (or otherwise associated with) the user device 510, to output content (e.g., music) via the loudspeaker(s) of (or otherwise associated with) the user device 510, to display content on a display of (or otherwise associated with) the user device 510, and/or to send a directive to a secondary device (e.g., a directive to turn on a smart light). It is to be appreciated that the system component(s) may be configured to provide other functions in addition to those discussed herein, such as, without limitation, providing step-by-step directions for navigating from an origin location to a destination location, conducting an electronic commerce transaction on behalf of the user 505 as part of a shopping function, establishing a communication session (e.g., a video call) between the user 505 and another user, and so on.

In at least some embodiments, the user device 510, may send the audio data 711 to the wakeword detection component 720. If the wakeword detection component 720 detects a wakeword in the audio data 711, the wakeword detection component 720 may send an indication of such detection to the user device 510. In response to receiving the indication, the audio data 711 may be sent to the system component(s) 520 and/or the ASR component of the user device 510. The wakeword detection component 720 may also send an indication, to the user device 510, representing a wakeword was not detected. In response to receiving such an indication, the audio data 711 may not be sent to the system component(s) 520, and the user device 510 may prevent the ASR component of the user device 510 from further processing the audio data 711. In this situation, the audio data 711 can be discarded.

In some embodiments, the user device 510 may include some or all of the components illustrated in FIG. 7 and/or discussed herein above with respect to the system component(s) 520. In other embodiments, the components illustrated in FIG. 7 and/or discussed herein with respect to the system component(s) 520 may be distributed across the user device 510 and the system component(s) 520.

In at least some embodiments, the components of the user device 510 (e.g., on-device components) may not have the same capabilities as the components of the system component(s) 520. For example, on-device components may be configured to generate a response to only a subset of the natural language user inputs that may be handled by the system component(s) 520. For example, such subset of natural language user inputs may correspond to local-type natural language user inputs, such as those controlling devices or components associated with a user's home. In such circumstances the on-device components may be able to more quickly interpret and respond to a local-type natural language user input, for example, than processing that involves the system component(s). If the user device 510 attempts to process a natural language user input for which the on-device components are not necessarily best suited, the language processing results determined by the user device 510 may indicate a low confidence or other metric indicating that the processing by the user device 510 may not be as accurate as the processing done by the system component(s) 520.

In some embodiments, the system component(s) 520 and the user device 510 may process as described herein to generate responses to the user input corresponding to the audio data 711. The system component(s) 520 may send the response to the user device 510 and the user device 510 may determine whether to output the response generated by the system component(s) 520 or the response generated by the user device 510. In some embodiments, the system component(s) 520 may be configured to perform a portion of the processing described herein, such as a portion of processing not performable by the user device 510 and send the result of such processing to the user device 510. The user device 510 may be configured to determine whether to use the result to complete processing to generate the response to the user device 510.

In at least some embodiments, the user device 510 may include, or be configured to use, one or more skill/app components that may operate similarly to the skill/app component(s) 554. The skill/app component(s) on the user device 510 may correspond to one or more domains that are used in order to determine how to act on a spoken input in a particular way, such as by outputting a directive that corresponds to the determined intent, and which can be processed to implement the desired operation. The skill component(s) installed on the user device 510 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally, or alternatively, the user device 510 may be in communication with one or more skill system component(s) 725. For example, a skill system component(s) 725 may be located in a remote environment (e.g., separate location) such that the user device 510 may only communicate with the skill system component(s) 725 via the network(s) 199. However, the disclosure is not limited thereto. For example, in at least some embodiments, a skill system component(s) 725 may be configured in a local environment (e.g., home server and/or the like) such that the user device 510 may communicate with the skill system component(s) 725 via a private network, such as a local area network (LAN).

Figure 8:
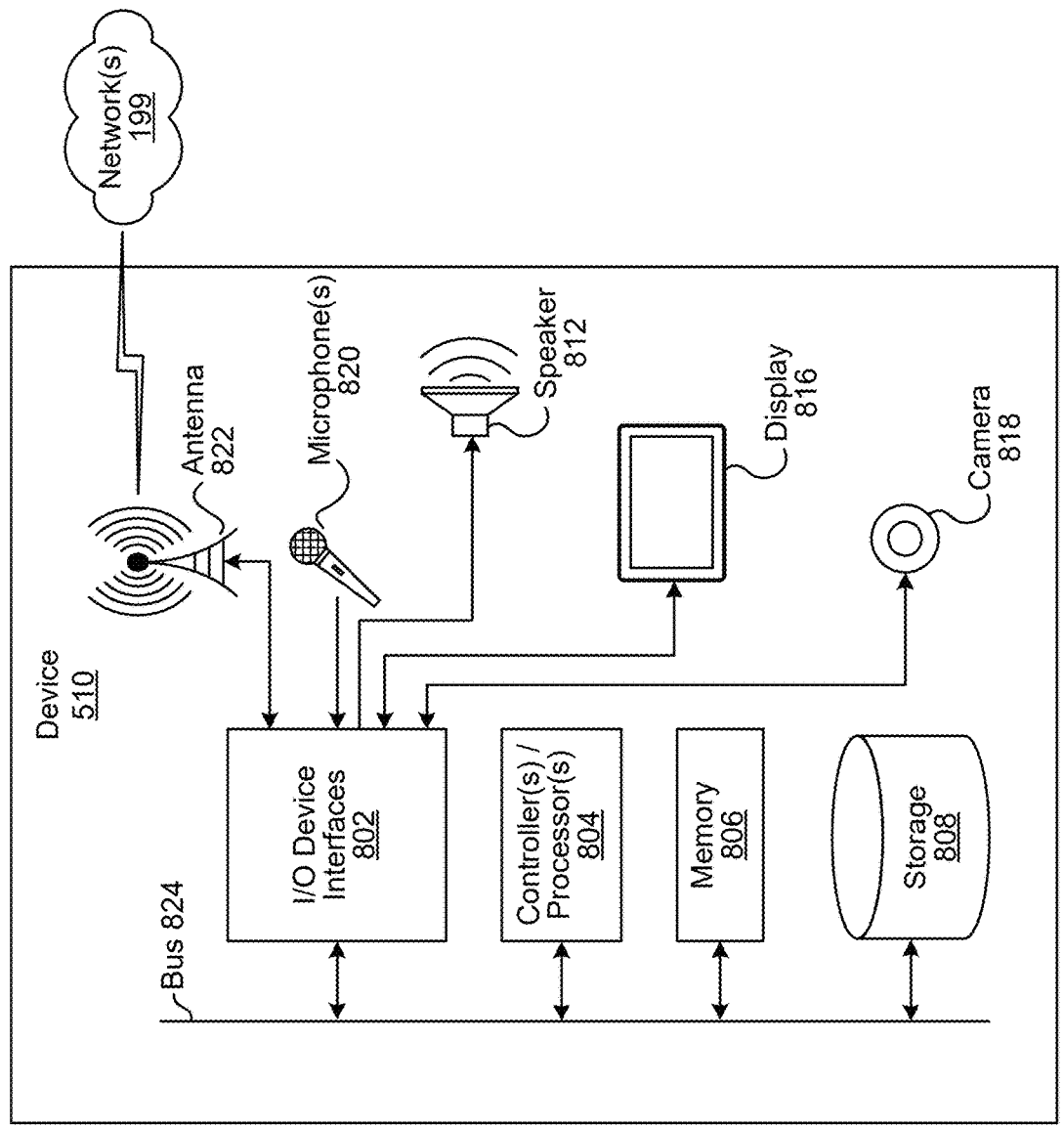
FIG. 8 is a block diagram conceptually illustrating example components of a device, according to embodiments of the present disclosure.
Figure 9:
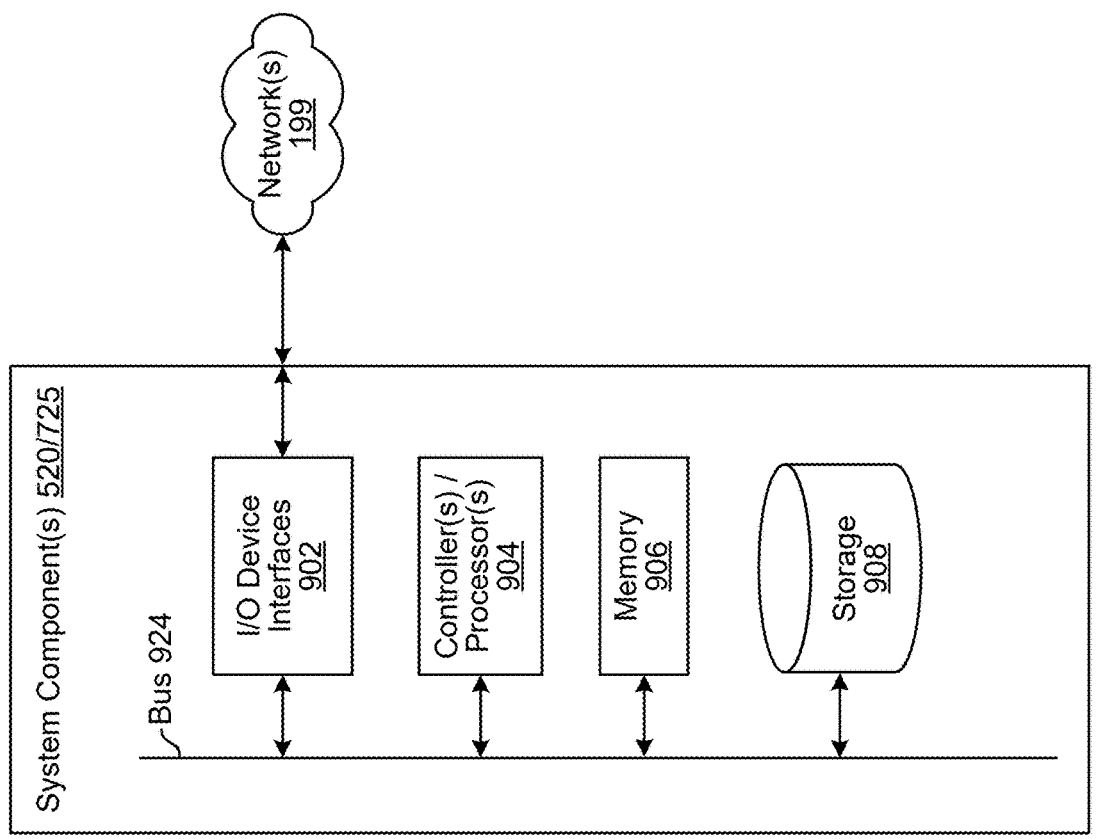
FIG. 9 is a block diagram conceptually illustrating example components of a system, according to embodiments of the present disclosure.

FIG. 8 is a block diagram conceptually illustrating a user device 510 that may be used with the system. FIG. 9 is a block diagram conceptually illustrating example components of a remote device, such as the system component(s) 520, which may assist with ASR processing, NLU processing, language model processing, etc., and a skill system component(s) 725. System component(s) (520/725) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

While the user device 510 may operate locally to a user (e.g., within a same environment so the device may receive inputs and playback outputs for the user) the server/system component(s) may be located remotely from the user device 510 as its operations may not require proximity to the user. The server/system component(s) may be located in an entirely different location from the user device 510 (for example, as part of a cloud computing system or the like) or may be located in a same environment as the user device 510 but physically separated therefrom (for example a home server or similar device that resides in a user's home or business but perhaps in a closet, basement, attic, or the like). The system component(s) 520 may also be a version of a user device 510 that includes different (e.g., more) processing capabilities than other user device(s) 510 in a home/office. One benefit to the server/system component(s) being in a user's home/business is that data used to process a command/return a response may be kept within the user's home, thus reducing potential privacy concerns.

Multiple system components (520/725) may be included in the overall system 100 of the present disclosure, such as one or more natural language processing system component(s) 520 for performing ASR processing, one or more natural language processing system component(s) 520 for performing NLU processing, one or more skill system component(s) 725, etc. In operation, each of these systems may include computer-readable and computer-executable instructions that reside on the respective device (520/725), as will be discussed further below.

Each of these devices (510/520/725) may include one or more controllers/processors (804/904), which may each include a central processing unit (CPU) for processing data and computer-readable instructions, and a memory (806/906) for storing data and instructions of the respective device. The memories (806/906) may individually include volatile random-access memory (RAM), non-volatile read only memory (ROM), non-volatile magnetoresistive memory (MRAM), and/or other types of memory. Each device (510/520/725) may also include a data storage component (808/908) for storing data and controller/processor-executable instructions. Each data storage component (808/908) may individually include one or more non-volatile storage types such as magnetic storage, optical storage, solid-state storage, etc. Each device (510/520/725) may also be connected to removable or external non-volatile memory and/or storage (such as a removable memory card, memory key drive, networked storage, etc.) through respective input/output device interfaces (802/902).

Computer instructions for operating each device (510/520/725) and its various components may be executed by the respective device's controller(s)/processor(s) (804/904), using the memory (806/906) as temporary "working" storage at runtime. A device's computer instructions may be stored in a non-transitory manner in non-volatile memory (806/906), storage (808/908), or an external device(s). Alternatively, some or all of the executable instructions may be embedded in hardware or firmware on the respective device in addition to or instead of software.

Each device (510/520/725) includes input/output device interfaces (802/902). A variety of components may be connected through the input/output device interfaces (802/902), as will be discussed further below. Additionally, each device (510/520/725) may include an address/data bus (824/924) for conveying data among components of the respective device. Each component within a device (510/520/725) may also be directly connected to other components in addition to (or instead of) being connected to other components across the bus (824/924).

Referring to FIG. 8, the user device 510 may include input/output device interfaces 802 that connect to a variety of components such as an audio output component such as a speaker 812, a wired headset or a wireless headset (not illustrated), or other component capable of outputting audio. The user device 510 may also include an audio capture component. The audio capture component may be, for example, a microphone 820 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The user device 510 may additionally include a display 816 for displaying content. The user device 510 may further include a camera 818.

Via antenna(s) 822, the input/output device interfaces 802 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (802/902) may also include communication components that allow data to be exchanged between devices such as different physical servers in a collection of servers or other components.

The components of the user device(s) 510, the system component(s) 520, or a skill system component(s) 725 may include their own dedicated processors, memory, and/or storage. Alternatively, one or more of the components of the user device(s) 510, the system component(s) 520, or a skill system component(s) 725 may utilize the I/O interfaces (802/902), processor(s) (804/904), memory (806/906), and/or storage (808/908) of the user device(s) 510, the system component(s) 520, or the skill system component(s) 725, respectively. Thus, the ASR component 750 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the user device 510, the system component(s) 520, and a skill system component(s) 725, as described herein, are illustrative, and may be located as a stand-alone device or may be included, in whole or in part, as a component of a larger device or system. As can be appreciated, a number of components may exist either as a system component(s) and/or on user device 510. Unless expressly noted otherwise, the system version of such components may operate similarly to the user device version of such components and thus the description of one version (e.g., the system version or the local user device version) applies to the description of the other version (e.g., the local user device version or system version) and vice-versa.

Figure 10:
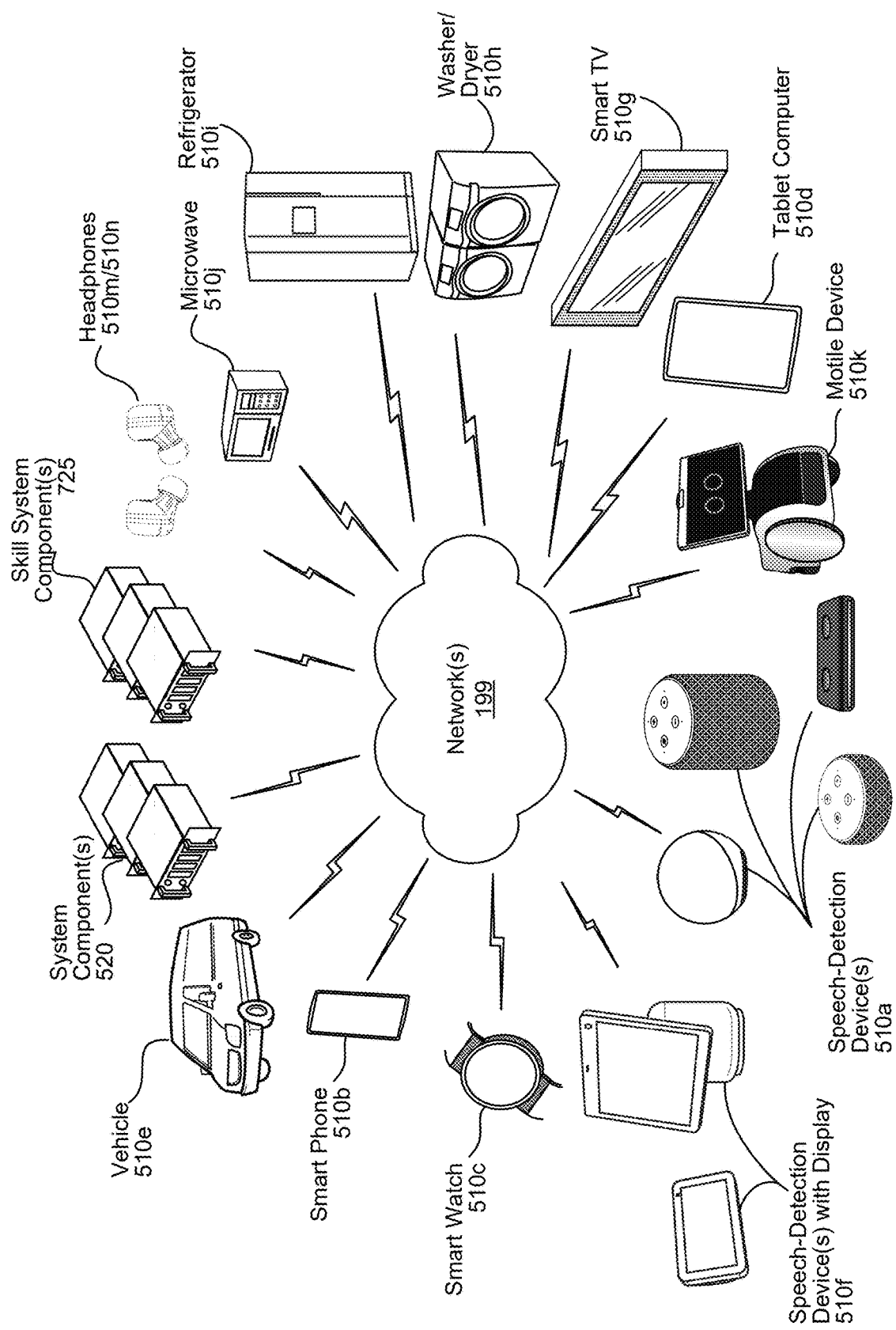
FIG. 10 illustrates an example of a network for use with the overall system, according to embodiments of the present disclosure.

As illustrated in FIG. 10, multiple devices (510a-510n, 520, 725) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection user device 510a, a smart phone 510b, a smart watch 510c, a tablet computer 510d, a vehicle 510e, a speech-detection device with display 510f, a display/smart television 510g, a washer/dryer 510h, a refrigerator 510i, a microwave 510j, autonomously motile user device 510k (e.g., a robot), headphones 510m/510n (e.g., wireless ear-buds, wireless headphones), etc., may be connected to the network(s) 199 through a wireless service provider, over a Wi-Fi or cellular network connection, or the like. Other devices are included as network-connected support devices, such as the system component(s) 520, the skill system component(s) 725, and/or others. The support devices may connect to the network(s) 199 through a wired connection or wireless connection. Networked devices may capture audio using one-or-more built-in or connected microphones or other audio capture devices, with processing performed by components of the same device or another device connected via the network(s) 199, such as the system component(s) 520.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving user affinity data associated with a user profile identifier;
   determining, using the user affinity data, a first entity corresponding to a user affinity;
   determining a prompt including:
      a first directive for a language model to generate, based on the first entity, an initial query usable by a content provider to retrieve first supplemental content corresponding to the first entity, and
      a second directive for the language model to generate at least one enriched query based on the initial query, wherein the at least one enriched query corresponds to the initial query updated to include different information usable by the content provider to retrieve second supplemental content corresponding to the first entity, wherein the second supplemental content is likely to be of greater interest to a user than the first supplemental content;
   processing, using the language model, the prompt to generate model output data including the initial query and at least a first enriched query;
   determining a search request based on the first enriched query;
   sending the search request to the content provider;
   receiving, from the content provider, a plurality of supplemental content results corresponding to the search request;
   storing first data associating the plurality of supplemental content results and the user profile identifier;
   receiving a user input associated with the user profile identifier, the user input requesting performance of an action;
   determining, based at least in part on the user input, a first supplemental content result from the plurality of supplemental content results, the first supplemental content result to be presented in addition to performance of the action requested by the user input;
causing performance of the action; and
causing presentation of the first supplemental content result.

2. The computer-implemented method of claim 1, further comprising:
determining a third directive for generating the first enriched query corresponding to the initial query, the third directive corresponding to a first entity type of the first entity, the third directive including a second entity type for a second entity to be added to the initial query to generate the first enriched query;
determining second data representing an example initial query and an example enriched query corresponding to the example initial query, the example initial query including a third entity corresponding to the first entity type and the example enriched query including a fourth entity corresponding to the second entity type; and
determining the prompt to further include the third directive and the second data.

3. The computer-implemented method of claim 1, further comprising:
determining a first value representing the first supplemental content result corresponds to the first enriched query;
determining a second value representing a second supplemental content result from the plurality of supplemental content results does not correspond to the first enriched query;
based at least in part on the first value and the second value, determining a subset of supplemental content results from the plurality of supplemental content results, the subset of supplemental content results including at least the first supplemental content result and excluding the second supplemental content result; and
determining, based at least in part on the user input, the first supplemental content result from the subset of supplemental content results.

4. The computer-implemented method of claim 1, further comprising:
determining that a second supplemental content result of the plurality of supplemental content results includes inappropriate content;
determining a set of applications associated with the user profile identifier, the set representing applications accessible by a user associated with the user profile identifier;
determining that a third supplemental content result of the plurality of supplemental content results is accessible using a first application;
determining that the first application is excluded from the set of applications;
determining a subset of supplemental content results including the first supplemental content result and excluding the second supplemental content result and the third supplemental content result; and
determining, based at least in part on the user input, the first supplemental content result from the subset of supplemental content results.

5. A computer-implemented method comprising:
receiving a first entity based on user affinity data;
determining a prompt including:
a first request for a language model to generate, based on the first entity, a first query usable by a content provider to retrieve first supplemental content corresponding to the first entity, and
a second request for the language model to generate at least one second query based on the first query, wherein the at least one second query corresponds to the first query updated to include different information usable by the content provider to retrieve second supplemental content;
processing, using the language model, the prompt to generate model output data including the first query and the second query;
based on the model output data, determining a search request for the content provider; receiving, from the content provider, at least a first supplemental content result based on the search request; and
storing first data associating the first supplemental content result with a user profile identifier associated with the user affinity data, the first data to be used to present the first supplemental content result at a future time using the user profile identifier.

6. The computer-implemented method of claim 5, further comprising:
determining a third request for generating the at least one second query, the third request corresponding to a first entity type of the first entity, the third directive request including a second entity type for a second entity to be used to generate the at least one second query; and
determining the prompt to further include the third request.

7. The computer-implemented method of claim 5, further comprising:
determining second data representing an example initial query and an example enriched query corresponding to the example initial query, the example initial query including a second entity corresponding to a first entity type of the first entity and the example enriched query including a third entity corresponding to a second entity type; and
determining the prompt to further include the second data.

8. The computer-implemented method of claim 5, further comprising:
receiving, from the content provider, a plurality of supplemental content results including the first supplemental content result and a second supplemental content result;
determining a first value representing the first supplemental content result corresponds to the first query or the second query;
determining a second value representing the second supplemental content result does not correspond to the first query or the second query;
based at least in part on the first value and the second value, determining a subset of supplemental content results from the plurality of supplemental content results; and
storing the first data to include the subset of supplemental content results.

9. The computer-implemented method of claim 5, further comprising:
receiving, from the content provider, a plurality of supplemental content results including the first supplemental content result and a second supplemental content result;
determining a set of accessible applications associated with the user profile identifier;
determining that the second supplemental content result is accessible using a first application;
determining that the first application is excluded from the set of accessible applications;

determining a subset of supplemental content results including the first supplemental content result and excluding the second supplemental content result; and storing the first data to include the subset of supplemental content results.

10. The computer-implemented method of claim 5, further comprising:

receiving user profile data including past interaction data and the user affinity data; and determining, using the user profile data, a set of entities including the first entity, wherein the prompt includes the first request for the language model to generate a set of queries based on the set of entities, wherein the set of queries correspond to a set of content providers.

11. The computer-implemented method of claim 5, further comprising:

receiving input data associated with the user profile identifier, the input data including a user input requesting performance of an action;

determining, based at least in part on the user input, the first supplemental content result to be presented in addition to performance of the action requested by the user input;

causing performance of the action; and causing presentation of the first supplemental content result.

12. A system comprising:

at least one processor; and at least one memory including instructions that, when executed by the at least one processor, cause the system to:

receive a first entity based on user affinity data;

determine a prompt including:

a first request for a language model to generate, based on the first entity, a first query usable by a content provider to retrieve first supplemental content corresponding to the first entity, a second request for the language model to generate at least one second query based on the first query, wherein the at least one second query corresponds to the first query updated to include different information usable by the content provider to retrieve second supplemental content;

process, using the language model, the prompt to generate model output data including the first query and the second query;

based on the model output data, determine a search request for the content provider;

receive, from the content provider, at least a first supplemental content result based on the search request; and store first data associating the first supplemental content result with a user profile identifier associated with the user affinity data, the first data to be used to present the first supplemental content result at a future time using the user profile identifier.

13. The system of claim 12, wherein the at least one memory includes further instructions that, when executed by the at least one processor, further cause the system to:

determine a third request for generating the at least one second query, the third request corresponding to a first entity type of the first entity, the third request including a second entity type for a second entity to be used to generate the at least one second query; and determine the prompt to further include the third request.

14. The system of claim 12, wherein the at least one memory includes further instructions that, when executed by the at least one processor, further cause the system to:

determine second data representing an example initial query and an example enriched query corresponding to the example initial query, the example initial query including a second entity corresponding to a first entity type of the first entity and the example enriched query including a third entity corresponding to a second entity type; and determine the prompt to further include the second data.

15. The system of claim 12, wherein the at least one memory includes further instructions that, when executed by the at least one processor, further cause the system to:

receive, from the content provider, a plurality of supplemental content results including the first supplemental content result and a second supplemental content result;

determine a first value representing the first supplemental content result corresponds to the first query or second query;

determine a second value representing the second supplemental content result does not correspond to the first query or second query;

based at least in part on the first value and the second value, determine a subset of supplemental content results from the plurality of supplemental content results; and store the first data to include the subset of supplemental content results.

16. The system of claim 12, wherein the at least one memory includes further instructions that, when executed by the at least one processor, further cause the system to:

receive, from the content provider, a plurality of supplemental content results including the first supplemental content result and a second supplemental content result;

determine a set of accessible applications associated with the user profile identifier;

determine that the second supplemental content result is accessible using a first application;

determine that the first application is excluded from the set of accessible applications;

determine a subset of supplemental content results including the first supplemental content result and excluding the second supplemental content result; and store the first data to include the subset of supplemental content results.

17. The system of claim 12, wherein the at least one memory includes further instructions that, when executed by the at least one processor, further cause the system to:

receive user profile data including past interaction data and the user affinity data; and determine, using the user profile data, a set of entities including the first entity, wherein the prompt includes the first request for the language model to generate a set of queries based on the set of entities, wherein the set of queries correspond to a set of content providers.

18. The system of claim 12, wherein the at least one memory includes further instructions that, when executed by the at least one processor, further cause the system to:

receive input data associated with the user profile identifier, the input data including a user input requesting performance of an action;

determine, based at least in part on the user input, the first supplemental content result to be presented in addition to performance of the action requested by the user input;

cause performance of the action; and cause presentation of the first supplemental content result.

* * * * *